United States Patent
Zheng et al.

(10) Patent No.: US 10,789,134 B2
(45) Date of Patent: Sep. 29, 2020

(54) NVRAM LOSS HANDLING

(71) Applicant: NetApp, Inc., Sunnyvale, CA (US)

(72) Inventors: Ling Zheng, Saratoga, CA (US); Jeffrey S. Kimmel, Chapel Hill, NC (US)

(73) Assignee: NetApp, Inc., Sunnyvale, CA (US)

( * ) Notice: Subject to any disclaimer, the term of this patent is extended or adjusted under 35 U.S.C. 154(b) by 370 days.

(21) Appl. No.: 15/130,280

(22) Filed: Apr. 15, 2016

(65) Prior Publication Data
US 2017/0300388 A1    Oct. 19, 2017

(51) Int. Cl.
*G06F 11/14* (2006.01)

(52) U.S. Cl.
CPC .............................. *G06F 11/1464* (2013.01)

(58) Field of Classification Search
CPC .... G06F 11/1464; G06F 3/0619; G06F 3/065; G06F 3/0659; G06F 3/0689; G06F 2201/84
USPC ........................................................ 707/649
See application file for complete search history.

(56) References Cited

U.S. PATENT DOCUMENTS

| | | | |
|---|---|---|---|
| 7,249,150 B1 | 7/2007 | Watanabe et al. | |
| 7,451,167 B2 | 11/2008 | Bali et al. | |
| 7,681,076 B1 | 3/2010 | Sarma | |
| 7,899,791 B1 | 3/2011 | Gole | |
| 8,074,019 B2 | 12/2011 | Gupta et al. | |
| 8,806,115 B1 * | 8/2014 | Patel | G06F 11/1471 711/103 |
| 8,849,764 B1 * | 9/2014 | Long | G06F 11/1451 707/646 |
| 8,880,787 B1 * | 11/2014 | Kimmel | G06F 12/0246 711/103 |
| 8,904,231 B2 | 12/2014 | Coatney et al. | |
| 9,954,946 B2 * | 4/2018 | Shetty | H04L 67/1095 |
| 2009/0249001 A1 * | 10/2009 | Narayanan | G06F 1/3203 711/161 |
| 2014/0095758 A1 | 4/2014 | Smith et al. | |
| 2014/0372384 A1 * | 12/2014 | Long | G06F 17/30289 707/679 |
| 2015/0213032 A1 * | 7/2015 | Powell | G06F 17/30079 707/827 |

(Continued)

*Primary Examiner* — Hosain T Alam
*Assistant Examiner* — Nicholas E Allen
(74) *Attorney, Agent, or Firm* — Cesari and McKenna, LLP

(57) ABSTRACT

A technique restores a file system of a storage input/output (I/O) stack to a deterministic point-in-time state in the event of failure (loss) of non-volatile random access memory (NVRAM) of a node. The technique enables restoration of the file system to a safepoint stored on storage devices, such solid state drives (SSD), of the node with minimum data and metadata loss. The safepoint is a point-in-time during execution of I/O requests (e.g., write operations) at which data and related metadata of the write operations prior to the point-in-time are safely persisted on SSD such that the metadata relating to an image of the file system on SSD (on-disk) is consistent and complete. Upon reboot after NVRAM loss, the technique identifies (i) the most recent safepoint, as well as (ii) the inflight writes that were persistently stored on disk after the most recent safepoint. The data and metadata of those inflight writes are then deleted to place the on-disk file system to its state at the most recent safepoint.

20 Claims, 18 Drawing Sheets

(56) References Cited

U.S. PATENT DOCUMENTS

2015/0301964 A1\* 10/2015 Brinicombe ............ G06F 13/28
710/308

\* cited by examiner

NVRAM LOSS HANDLING

BACKGROUND

Technical Field

The present disclosure relates to storage systems and, more specifically, to restoring a file system, including metadata, in the event of a failure (loss) of non-volatile random access memory (NVRAM) of a storage system.

Background Information

A storage system typically includes one or more storage devices, such as disks embodied as solid state drives (SSDs), into which information may be entered, and from which information may be obtained, as desired. The storage system may implement a high-level module, such as a file system, to logically organize the information stored on disk as storage containers, such as files or logical units (LUNs), of the on-disk file system. These storage containers may be accessible by a host system using a data protocol over a network connecting the storage system to the host. Each storage container may be implemented as a set of data structures, such as data blocks that store data for the storage containers and metadata blocks that describe the data of the storage containers. For example, the metadata may describe, e.g., identify, storage locations on the disks for the data.

Non-volatile random access memory (NVRAM) may be used to temporarily store data and metadata related to in-flight operations, i.e., input/output (I/O) operations that have been received by the storage system and acknowledged to the host, but which have data and metadata stored in NVRAM that have not yet been persistently stored on disk (SSD). The metadata may be organized and processed as one or more data structures, wherein processing of the metadata involves execution of operations that modify the data structures. The metadata (and data structures) are part of a complete and consistent state of the on-disk file system. A failure of the NVRAM may thus result in the loss of such metadata for these in-flight operations which, in turn, may place the on-disk file system in an incomplete and inconsistent state.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
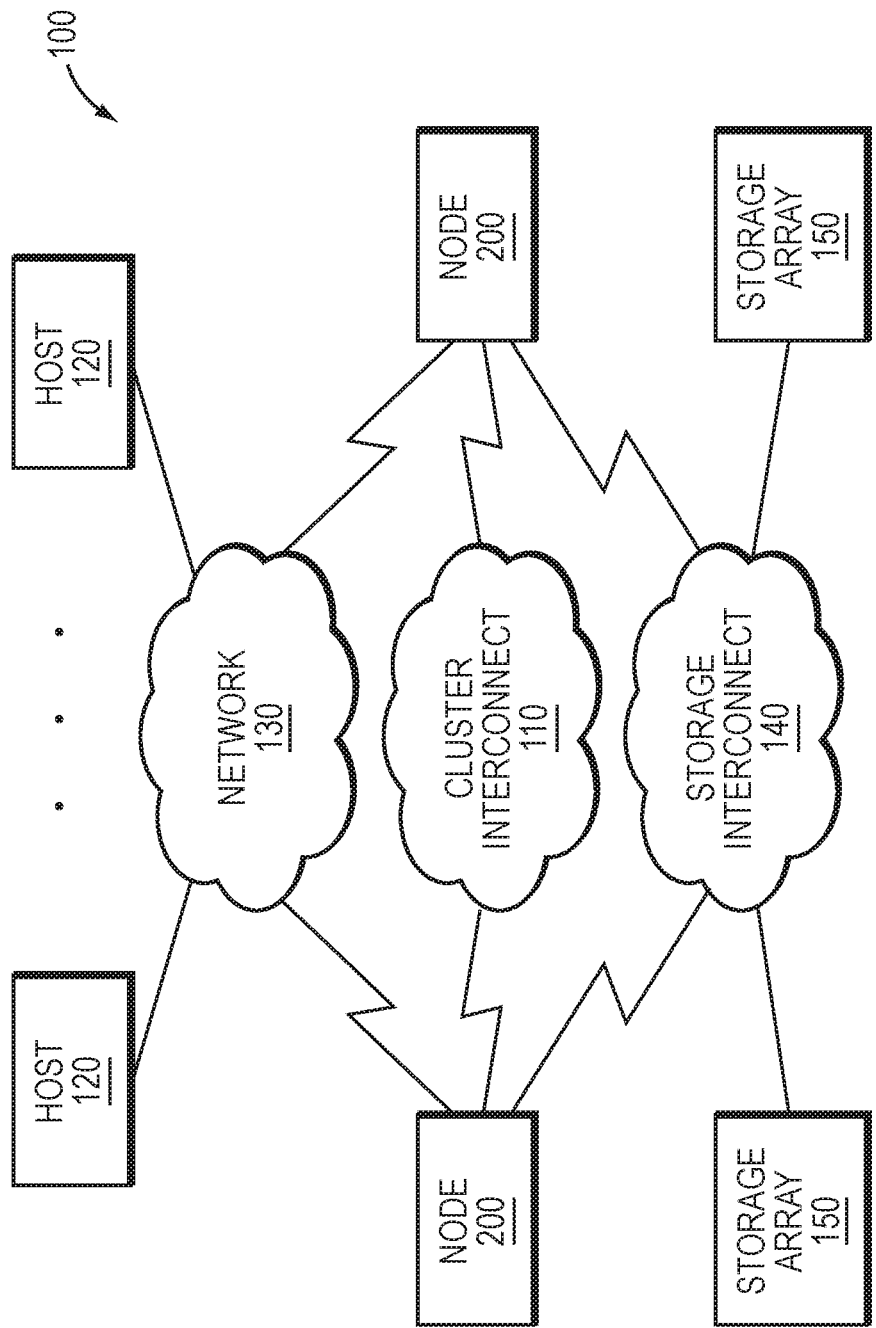
FIG. 1 is a block diagram of a plurality of nodes interconnected as a cluster.

The embodiments herein are directed to a technique for determining a safepoint for restoring a file system of a storage input/output (I/O) stack to a deterministic point-in-time state in the event of failure (loss) of non-volatile random access memory (NVRAM) of a node. To that end, the technique enables restoration of the file system to a safepoint stored on storage devices, such solid state drives (SSD), of the node with minimum data and metadata loss. As used herein, the safepoint is a point-in-time during processing of I/O (e.g., write) requests at which data and related metadata of the write requests prior to the point-in-time are safely persisted on SSD such that the metadata relating to an image of the file system on SSD (on-disk) is consistent and complete. The data may be organized as variable-length extents of one or more host-visible logical units (LUNs) served by the node. The metadata may include mappings from host-visible logical block address ranges (i.e., offset ranges) of a LUN to extent keys, as well as mappings of the extent keys to SSD storage locations of the extents. An extent store layer of the file system performs and maintains the mappings of the extent keys to SSD storage locations, while a volume layer of the file system performs and maintains the mappings of the LUN offset ranges to the extent keys.

In an embodiment, the safepoint may be implemented as an epoch (a period of time during which writes stored on SSD are self-consistent). A persistence layer of the storage I/O stack assigns to each write request (write) a respective epoch value or identifier (ID), e.g., a monotonically increasing number, as the respective write is recorded (committed) to NVRAM. Writes committed to the NVRAM before an increase of the epoch ID belong to a previous epoch, whereas writes committed to NVRAM after the increase of the epoch ID belong to a current epoch. According to the technique, the safepoint may refer to an epoch ID value of N with the following properties: (i) any writes assigned the epoch ID value equal to or less than N should not have any associated NVRAM records in either the volume layer or the extent store (ES) layer of the storage I/O stack, (i.e., the associated NVRAM records are reclaimed/purged when all writes up to the safepoint are safely and persistently stored on disk as part of the on-disk file system image); and (ii) any writes assigned an epoch ID value greater than N should be isolated from the writes assigned the epoch ID value equal to or less than N (i.e., in-flight writes are isolated from writes persistently stored prior to the safepoint thereby preventing harm to the on-disk file system image). Accordingly, the on-disk file system image that captures all writes assigned to an epoch (i.e., a safepoint having the above properties) represents a checkpoint that may be used for recovery of the on-disk file system to a consistent state in the event of NVRAM loss.

The volume layer manages activity involving (volume) metadata of the writes (e.g., I/O operations), including the progress of an epoch and corresponding safepoint. Operations on the volume metadata processed by the volume layer modify or change the metadata of various data structures related to the on-disk file system, as well as modify or change contents of the NVRAM, which changes modify the on-disk file system. The operations on the volume metadata are illustratively processed by threads of execution, i.e., uniprocessor (UP) services, on central processing units (CPUs) of the nodes. For example, as the volume layer modifies (updates) the file system structure on-disk, metadata directed to the updates are stored as records in NVRAM and losing that metadata may place the on-disk file system in an inconsistent (or non-deterministic) state.

For an I/O operation to be considered safe (i.e., recoverable from persistent disk storage in the event of failure) by the volume layer, the data as well as the related (volume) metadata records in NVRAM are rendered safe. Illustratively, an I/O operation is rendered safe by the volume layer when all the data and metadata associated with the operation are persistently stored to disk as acknowledged by the ES layer. According to the technique, each volume UP service determines a safepoint and records the current epoch ID to identify that safepoint. That is, a safepoint may be determined for each volume UP service by tracking a total amount of I/O operations (i.e., writes) processed by the service during a given epoch and then waiting for acknowledgement (confirmation) from the ES layer that all those I/O operations (user data as well as related metadata) are persistently stored on SSD (i.e., all I/O operations are complete).

Upon reboot after NVRAM loss, the technique identifies (i) the most recent safepoint, as well as (ii) the inflight writes that were persistently stored on disk after the most recent safepoint. In an embodiment, the most recent safepoint is illustratively a minimum of recorded epoch IDs among all volume UP services. That is, upon reboot, the epoch IDs are examined and the minimum of recorded epoch IDs is chosen as the most recent safepoint. The data and metadata of those in-flight writes are then deleted to place the on-disk file system to its state at the most recent safepoint.

DESCRIPTION

Storage Cluster

FIG. 1 is a block diagram of a plurality of nodes 200 interconnected as a cluster 100 and configured to provide storage service relating to the organization of information on storage devices. The nodes 200 may be interconnected by a cluster interconnect fabric 110 and include functional components that cooperate to provide a distributed storage architecture of the cluster 100, which may be deployed in a storage area network (SAN). As described herein, the components of each node 200 include hardware and software functionality that enable the node to connect to one or more hosts 120 over a computer network 130, as well as to one or more storage arrays 150 of storage devices over a storage interconnect 140, to thereby render the storage service in accordance with the distributed storage architecture.

Each host 120 may be embodied as a general-purpose computer configured to interact with any node 200 in accordance with a client/server model of information delivery. That is, the client (host) may request the services of the node, and the node may return the results of the services requested by the host, by exchanging packets over the network 130. The host may issue packets including file-based access protocols, such as the Network File System (NFS) protocol over the Transmission Control Protocol/Internet Protocol (TCP/IP), when accessing information on the node in the form of storage containers such as files and directories. However, in an embodiment, the host 120 illustratively issues packets including block-based access protocols, such as the Small Computer Systems Interface (SCSI) protocol encapsulated over TCP (iSCSI) and SCSI encapsulated over FC (FCP), when accessing information in the form of storage containers such as logical units (LUNs). Notably, any of the nodes 200 may service a request directed to a storage container on the cluster 100.

Figure 2:
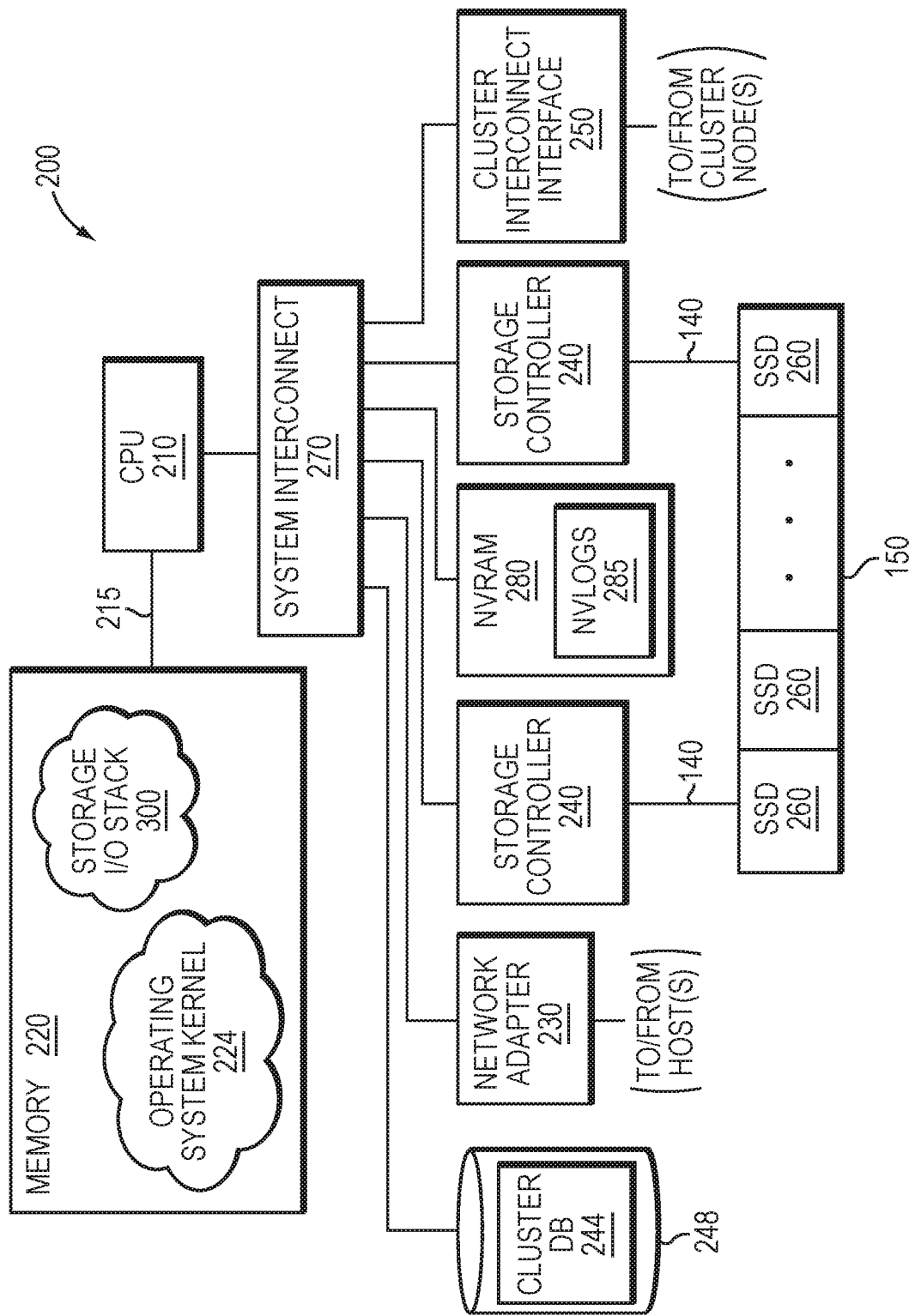
FIG. 2 is a block diagram of a node.

FIG. 2 is a block diagram of a node 200 that is illustratively embodied as a storage system having one or more central processing units (CPUs) 210 coupled to a memory 220 via a memory bus 215. The CPU 210 is also coupled to a network adapter 230, one or more storage controllers 240, a cluster interconnect interface 250 and a non-volatile random access memory (NVRAM 280) via a system interconnect 270. The network adapter 230 may include one or more ports adapted to couple the node 200 to the host(s) 120 over computer network 130, which may include point-to-point links, wide area networks, virtual private networks implemented over a public network (Internet) or a local area network. The network adapter 230 thus includes the mechanical, electrical and signaling circuitry needed to connect the node to the network 130, which illustratively embodies an Ethernet or Fibre Channel (FC) network.

The memory 220 may include memory locations that are addressable by the CPU 210 for storing software programs and data structures associated with the embodiments described herein. The CPU 210 may, in turn, include processing elements and/or logic circuitry configured to execute the software programs, such as a storage input/output (I/O) stack 300, and manipulate the data structures. Illustratively, the storage I/O stack 300 may be implemented as a set of user mode processes that may be decomposed into a plurality of threads. An operating system kernel 224, portions of which are typically resident in memory 220 (in-core) and executed by the processing elements (i.e., CPU 210), functionally organizes the node by, inter alia, invoking operations in support of the storage service implemented by the node and, in particular, the storage I/O stack 300. A suitable operating system kernel 224 may include a general-purpose operating system, such as the UNIX® series or Microsoft Windows® series of operating systems, or an operating system with configurable functionality such as microkernels and embedded kernels. However, in an embodiment described herein, the operating system kernel is illustratively the Linux® operating system. It will be apparent to those skilled in the art that other processing and memory means, including various computer readable media, may be used to store and execute program instructions pertaining to the embodiments herein.

Each storage controller 240 cooperates with the storage I/O stack 300 executing on the node 200 to access information requested by the host 120. The information is preferably stored on storage devices such as solid state drives (SSDs) 260, illustratively embodied as flash storage devices, of storage array 150. In an embodiment, the flash storage devices may be based on NAND flash components, e.g., single-layer-cell (SLC) flash, multi-layer-cell (MLC) flash or triple-layer-cell (TLC) flash, although it will be understood to those skilled in the art that other block-oriented, non-volatile, solid-state electronic devices (e.g., drives based on storage class memory components) may be advantageously used with the embodiments described herein. Accordingly, the storage devices may or may not be block-oriented (i.e., accessed as blocks). The storage controller 240 includes one or more ports having I/O interface circuitry that couples to the SSDs 260 over the storage interconnect 140, illustratively embodied as a serial attached SCSI (SAS) topology. Alternatively, other point-to-point I/O interconnect arrangements such as a conventional serial ATA (SATA) topology or a PCI topology, may be used. The system interconnect 270 may also couple the node 200 to a local service storage device 248, such as an SSD, configured to locally store cluster-related configuration information, e.g., as cluster database (DB) 244, which may be replicated to the other nodes 200 in the cluster 100.

The cluster interconnect interface 250 may include one or more ports adapted to couple the node 200 to the other node(s) of the cluster 100. In an embodiment, Ethernet may be used as the clustering protocol and interconnect fabric media, although it will be apparent to those skilled in the art that other types of protocols and interconnects, such as Infiniband, may be utilized within the embodiments described herein. The NVRAM 280 may include a back-up battery or other built-in last-state retention capability (e.g., non-volatile semiconductor memory such as storage class memory) that is capable of maintaining data in light of a failure to the node and cluster environment. Illustratively, a portion of the NVRAM 280 may be configured as one or more non-volatile logs (NVLogs 285) configured to temporarily record ("log") I/O requests, such as write requests, received from the host 120.

Storage I/O Stack

Figure 3:
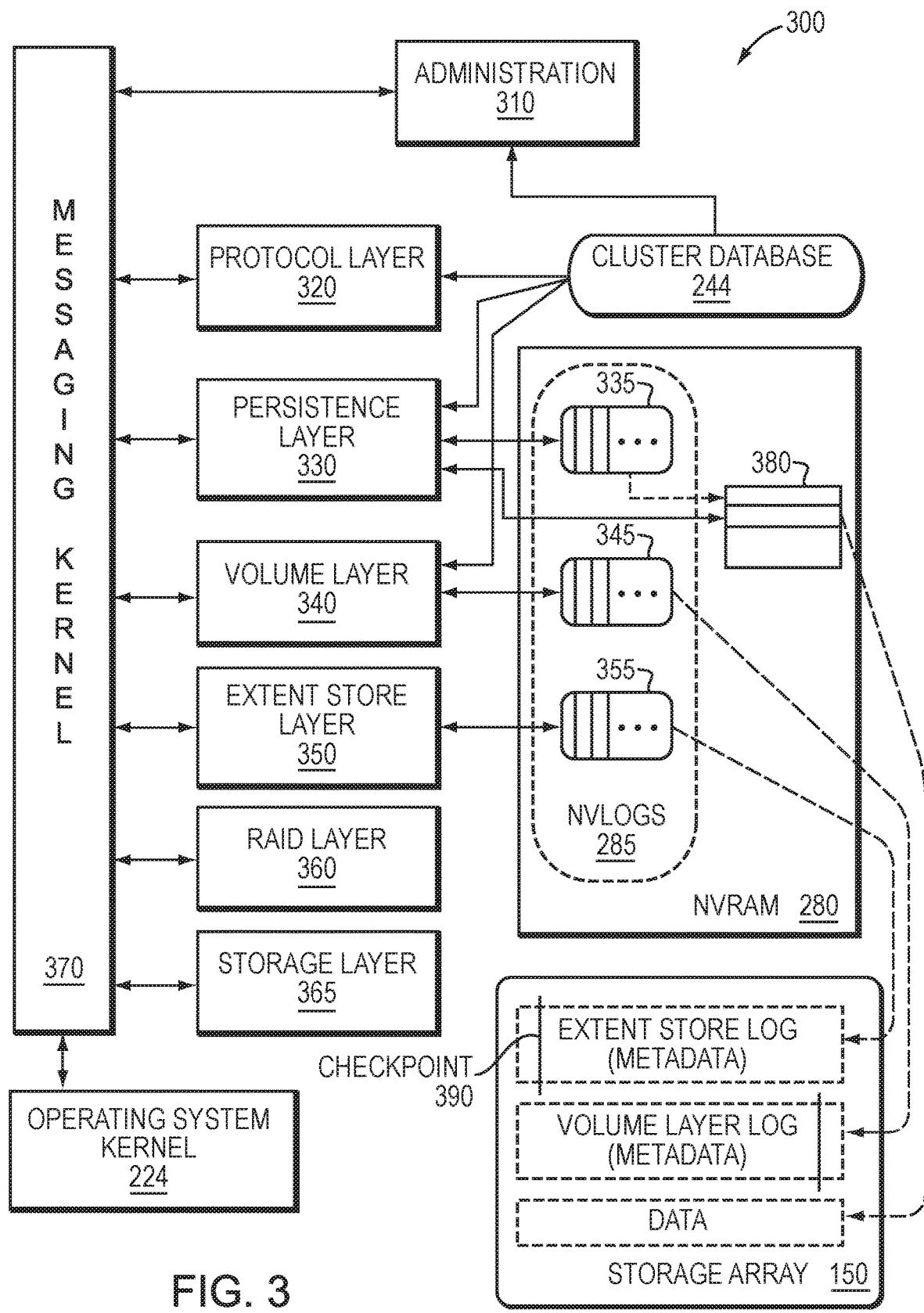
FIG. 3 is a block diagram of a storage input/output (I/O) stack of the node.

FIG. 3 is a block diagram of the storage I/O stack 300 that may be advantageously used with one or more embodiments described herein. The storage I/O stack 300 includes a plurality of software modules or layers that cooperate with other functional components of the nodes 200 to provide the distributed storage architecture of the cluster 100. In an embodiment, the distributed storage architecture presents an abstraction of a single storage container, i.e., all of the storage arrays 150 of the nodes 200 for the entire cluster 100 organized as one large pool of storage. In other words, the architecture consolidates storage, i.e., the SSDs 260 of the arrays 150, throughout the cluster (retrievable via cluster-wide keys) to enable storage of the LUNs. Both storage capacity and performance may then be subsequently scaled by adding nodes 200 to the cluster 100.

Illustratively, the storage I/O stack 300 includes an administration layer 310, a protocol layer 320, a persistence layer 330, a volume layer 340, an extent store layer 350, a Redundant Array of Independent Disks (RAID) layer 360, a storage layer 365 and a NVRAM (storing NVLogs) "layer" interconnected with a messaging kernel 370. The messaging kernel 370 may provide a message-based (or event-based) scheduling model (e.g., asynchronous scheduling) that employs messages as fundamental units of work exchanged (i.e., passed) among the layers. Suitable message-passing mechanisms provided by the messaging kernel to transfer information between the layers of the storage I/O stack 300 may include, e.g., for intra-node communication: i) messages that execute on a pool of threads, ii) messages that execute on a single thread progressing as an operation through the storage I/O stack, iii) messages using an Inter Process Communication (IPC) mechanism and, e.g., for inter-node communication: messages using a Remote Procedure Call (RPC) mechanism in accordance with a function shipping implementation. Alternatively, the I/O stack may be implemented using a thread-based or stack-based execution model. In one or more embodiments, the messaging kernel 370 allocates processing resources from the operating system kernel 224 to execute the messages. Each storage I/O stack layer may be implemented as one or more instances (i.e., processes) executing one or more threads (e.g., in kernel or user space) that process the messages passed between the layers such that the messages provide synchronization for blocking and non-blocking operation of the layers.

In an embodiment, the protocol layer 320 may communicate with the host 120 over the network 130 by exchanging discrete frames or packets configured as I/O requests according to pre-defined protocols, such as iSCSI and FCP. An I/O request, e.g., a read or write request, may be directed to a LUN and may include I/O parameters such as, inter alia, a LUN identifier (ID), a logical block address (LBA) of the LUN, a length (i.e., amount of data) and, in the case of a write request, write data. The protocol layer 320 receives the I/O request and forwards it to the persistence layer 330, which records the request into a persistent write-back cache 380, illustratively embodied as a log whose contents can be replaced randomly, e.g., under some random access replacement policy rather than only in serial fashion, and returns an acknowledgement to the host 120 via the protocol layer 320. In an embodiment only I/O requests that modify the LUN, e.g., write requests, are logged. Notably, the I/O request may be logged at the node receiving the I/O request, or in an alternative embodiment in accordance with the function shipping implementation, the I/O request may be logged at another node.

Illustratively, dedicated logs may be maintained by the various layers of the storage I/O stack 300. For example, a dedicated log 335 may be maintained by the persistence layer 330 to record the I/O parameters of an I/O request as equivalent internal, i.e., storage I/O stack, parameters, e.g., volume ID, offset, and length. In the case of a write request, the persistence layer 330 may also cooperate with the NVRAM 280 to implement the write-back cache 380 configured to record (commit) the write request, including the write data associated with the request. In an embodiment, the write-back cache 380 may be structured as a log. Notably, the write data for the write request may be physically stored in the cache 380 such that the log 335 contains the reference to the associated write data. It will be understood to persons skilled in the art the other variations of data structures may be used to store or maintain the write data in NVRAM including data structures with no logs. In an embodiment, a copy of the write-back cache may also be maintained in the memory 220 to facilitate direct memory access to the storage controllers. In other embodiments, caching may be performed at the host 120 or at a receiving node in accordance with a protocol that maintains coherency between the data stored at the cache and the cluster.

In an embodiment, the administration layer 310 may apportion the LUN into multiple volumes, each of which may be partitioned into multiple regions (e.g., allotted as disjoint block address ranges), with each region having one or more segments stored as multiple stripes on the array 150. A plurality of volumes distributed among the nodes 200 may thus service a single LUN, i.e., each volume within the LUN services a different LBA range (i.e., offset range) or set of ranges within the LUN. Accordingly, the protocol layer 320 may implement a volume mapping technique to identify a volume to which the I/O request is directed (i.e., the volume servicing the offset range indicated by the parameters of the I/O request). Illustratively, the cluster database 244 may be configured to maintain one or more associations (e.g., key-value pairs) for each of the multiple volumes, e.g., an association between the LUN ID and a volume, as well as an association between the volume and a node ID for a node managing the volume. The administration layer 310 may also cooperate with the database 244 to create (or delete) one or more volumes associated with the LUN (e.g., creating a volume ID/LUN key-value pair in the database 244). Using the LUN ID and LBA (or LBA range), the volume mapping technique may provide a volume ID (e.g., using appropriate associations in the cluster database 244) that identifies the volume and node servicing the volume destined for the request, as well as translate the LBA (or LBA range) into an offset and length within the volume. Specifically, the volume ID is used to determine a volume layer instance that manages volume metadata associated with the LBA or LBA range. As noted, the protocol layer 320 may pass the I/O request (i.e., volume ID, offset and length) to the persistence layer 330, which may use the function shipping (e.g., inter-node) implementation to forward the I/O request to the appropriate volume layer instance executing on a node in the cluster based on the volume ID.

In an embodiment, the volume layer 340 may manage the volume metadata by, e.g., maintaining states of host-visible containers, such as ranges of LUNs, and performing data management functions, such as creation of snapshots and clones, for the LUNs in cooperation with the administration layer 310. The volume metadata is illustratively embodied as in-core mappings from LUN addresses (i.e., LBAs) to durable extent keys, which are unique cluster-wide IDs associated with SSD storage locations for extents within an extent key space of the cluster-wide storage container. That is, an extent key may be used to retrieve the data of the extent at an SSD storage location associated with the extent key. Alternatively, there may be multiple storage containers in the cluster wherein each container has its own extent key space, e.g., where the administration layer 310 provides distribution of extents among the storage containers. An extent is a variable length block of data that provides a unit of storage on the SSDs and that need not be aligned on any specific boundary, i.e., it may be byte aligned. Accordingly, an extent may be an aggregation of write data from a plurality of write requests to maintain such alignment. Illustratively, the volume layer 340 may record the forwarded request (e.g., information or parameters characterizing the request), as well as changes to the volume metadata, in dedicated log 345 maintained by the volume layer 340. Subsequently, the contents of the volume layer log 345 may be written to the storage array 150 in accordance with a checkpoint (e.g., synchronization) operation that stores in-core metadata on the array 150. That is, the checkpoint operation (checkpoint) ensures that a consistent state of metadata, as processed in-core, is committed to (i.e., stored on) the storage array 150; whereas the retirement of log entries ensures that the entries accumulated in the volume layer log 345 synchronize with the metadata checkpoints committed to the storage array 150 by, e.g., retiring those accumulated log entries that are prior to the checkpoint. In one or more embodiments, the checkpoint and retirement of log entries may be data driven, periodic or both.

In an embodiment, the extent store layer 350 is responsible for storing extents prior to storage on the SSDs 260 (i.e., on the storage array 150) and for providing the extent keys to the volume layer 340 (e.g., in response to a forwarded write request). The extent store layer 350 is also responsible for retrieving data (e.g., an existing extent) using an extent key (e.g., in response to a forwarded read request). The extent store layer 350 may be responsible for performing de-duplication and compression on the extents prior to storage. The extent store layer 350 may maintain in-core mappings (e.g., embodied as hash tables) of extent keys to SSD storage locations (e.g., offset on an SSD 260 of array 150). The extent store layer 350 may also maintain a dedicated log 355 of entries that accumulate requested "put" and "delete" operations (i.e., write requests and delete requests for extents issued from other layers to the extent store layer 350), where these operations change the in-core mappings (i.e., hash table entries). Subsequently, the in-core mappings and contents of the extent store layer log 355 may be written to the storage array 150 in accordance with a "fuzzy" checkpoint 390 (i.e., checkpoint with incremental changes recorded in one or more log files) in which selected in-core mappings, less than the total, are committed to the array 150 at various intervals (e.g., driven by an amount of change to the in-core mappings, size thresholds of log 355, or periodically). Notably, the accumulated entries in log 355 may be retired once all in-core mappings have been committed to include the changes recorded in those entries prior to the first interval.

In an embodiment, the RAID layer 360 may organize the SSDs 260 within the storage array 150 as one or more RAID groups (e.g., sets of SSDs) that enhance the reliability and integrity of extent storage on the array by writing data "stripes" having redundant information, i.e., appropriate parity information with respect to the striped data, across a given number of SSDs 260 of each RAID group. The RAID layer 360 may also store a number of stripes (e.g., stripes of sufficient depth) at once, e.g., in accordance with a plurality of contiguous write operations, so as to reduce data relocation (i.e., internal flash block management) that may occur within the SSDs as a result of the operations. In an embodiment, the storage layer 365 implements storage I/O drivers that may communicate directly with hardware (e.g., the storage controllers and cluster interface) cooperating with the operating system kernel 224, such as a Linux virtual function I/O (VFIO) driver.

Write Path

Figure 4:
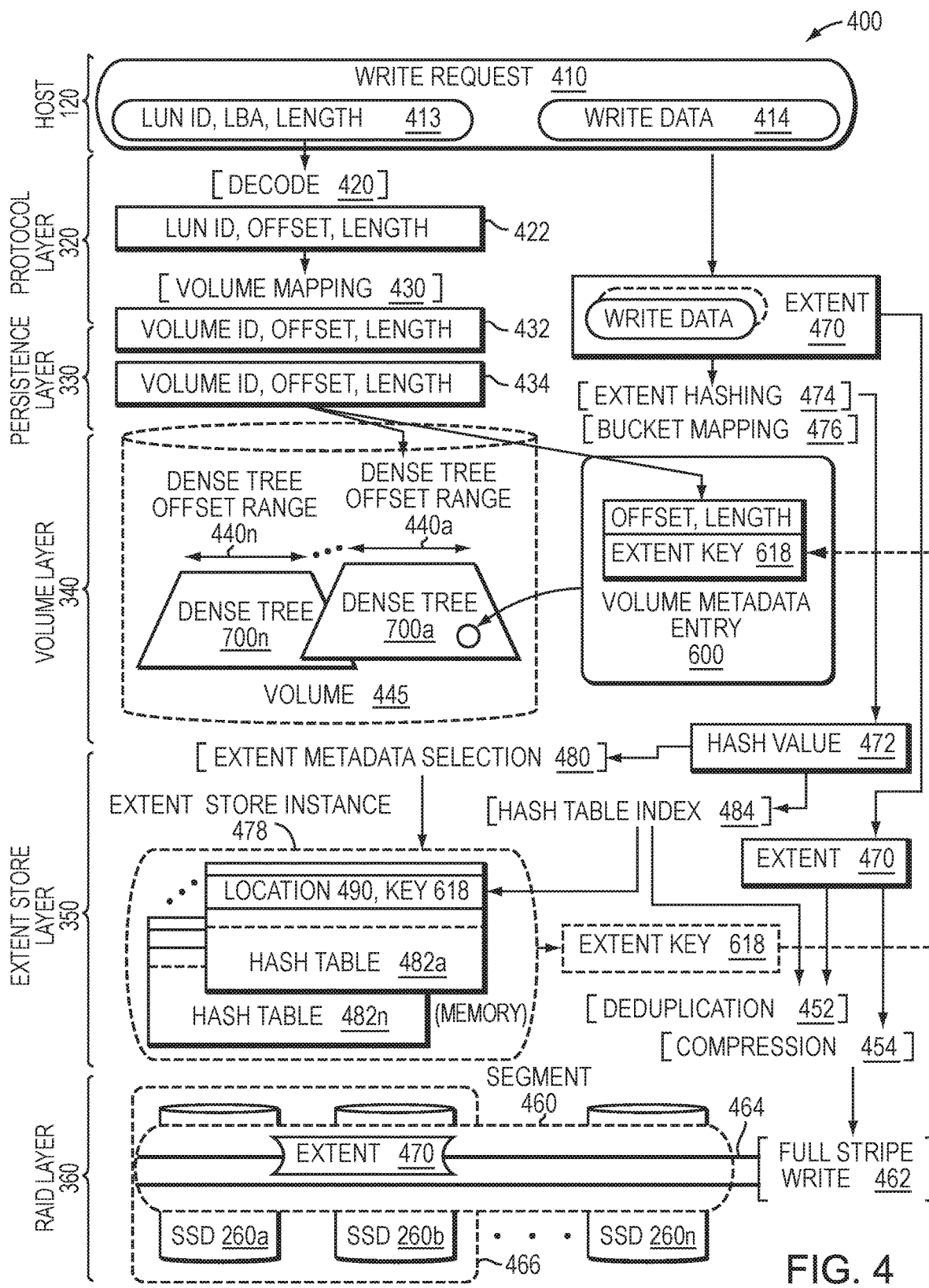
FIG. 4 illustrates a write path of the storage I/O stack.

FIG. 4 illustrates an I/O (e.g., write) path 400 of the storage I/O stack 300 for processing an I/O request, e.g., a SCSI write request 410. The write request 410 may be issued by host 120 and directed to a LUN stored on the storage array 150 of the cluster 100. Illustratively, the protocol layer 320 receives and processes the write request by decoding 420 (e.g., parsing and extracting) fields of the request, e.g., LUN ID, LBA and length (shown at 413), as well as write data 414. The protocol layer may use the results 422 from decoding 420 for a volume mapping technique 430 (described above) that translates the LUN ID and LBA range (i.e., equivalent offset and length) of the write request to an appropriate volume layer instance, i.e., volume ID (volume 445), in the cluster 100 that is responsible for managing volume metadata for the LBA range. In an alternative embodiment, the persistence layer 330 may implement the above described volume mapping technique 430. The protocol layer then passes the results 432, e.g., volume ID, offset, length (as well as write data), to the persistence layer 330, which records the request in the persistent layer log 335 and returns an acknowledgement to the host 120 via the protocol layer 320. The persistence layer 330 may aggregate and organize write data 414 from one or more write requests into a new extent 470 and perform a hash computation, i.e., a hash function, on the new extent to generate a hash value 472 in accordance with an extent hashing technique 474.

The persistent layer 330 may then pass the write request with aggregated write date including, e.g., the volume ID, offset and length, as parameters 434 of a message to the appropriate volume layer instance. In an embodiment, message passing of the parameters 434 (received by the persistent layer) may be redirected to another node via the function shipping mechanism, e.g., RPC, for inter-node communication.

Alternatively, message passing of parameters 434 may be via the IPC mechanism, e.g., message threads, for intra-node communication.

In one or more embodiments, a bucket mapping technique 476 is provided that translates the hash value 472 to an instance of an appropriate extent store layer (e.g., extent store instance 478) that is responsible for storing the new extent 470. Note that the bucket mapping technique may be implemented in any layer of the storage I/O stack above the extent store layer. In an embodiment, for example, the bucket mapping technique may be implemented in the persistence layer 330, the volume layer 340, or a layer that manages cluster-wide information, such as a cluster layer (not shown). Accordingly, the persistence layer 330, the volume layer 340, or the cluster layer may contain computer executable instructions executed by the CPU 210 to perform operations that implement the bucket mapping technique 476. The persistence layer 330 may then pass the hash value 472 and the new extent 470 to the appropriate volume layer instance and onto the appropriate extent store instance via an extent store put operation. The extent hashing technique 474 may embody an approximately uniform hash function to ensure that any random extent to be written may have an approximately equal chance of falling into any extent store instance 478, i.e., hash buckets are distributed across extent store instances of the cluster 100 based on available resources. As a result, the bucket mapping technique 476 provides load-balancing of write operations (and, by symmetry, read operations) across nodes 200 of the cluster, while also leveling flash wear in the SSDs 260 of the cluster.

In response to the put operation, the extent store instance may process the hash value 472 to perform an extent metadata selection technique 480 that (i) selects an appropriate hash table 482 (e.g., hash table 482a) from a set of hash tables (illustratively in-core) within the extent store instance 478, and (ii) extracts a hash table index 484 from the hash value 472 to index into the selected hash table and lookup a table entry having an extent key 618 identifying a storage location 490 on SSD 260 for the extent. Accordingly, the extent store layer 350 contains computer executable instructions executed by the CPU 210 to perform operations that implement the extent metadata selection technique 480 described herein. If a table entry with a matching extent key is found, then the SSD location 490 mapped from the extent key 618 is used to retrieve an existing extent (not shown) from SSD. The existing extent is then compared with the new extent 470 to determine whether their data is identical. If the data is identical, the new extent 470 is already stored on SSD 260 and a de-duplication opportunity (denoted de-duplication 452) exists such that there is no need to write another copy of the data. Accordingly, a reference count (not shown) in the table entry for the existing extent is incremented and the extent key 618 of the existing extent is passed to the appropriate volume layer instance for storage within an entry (denoted as volume metadata entry 600) of a dense tree metadata structure (e.g., dense tree 700a), such that the extent key 618 is associated an offset range 440 (e.g., offset range 440a) of the volume 445.

However, if the data of the existing extent is not identical to the data of the new extent 470, a collision occurs and a deterministic algorithm is invoked to sequentially generate as many new candidate extent keys (not shown) mapping to the same bucket as needed to either provide de-duplication 452 or produce an extent key that is not already stored within the extent store instance. Notably, another hash table (e.g. hash table 482n) may be selected by a new candidate extent key in accordance with the extent metadata selection technique 480. In the event that no de-duplication opportunity exists (i.e., the extent is not already stored) the new extent 470 is compressed in accordance with compression technique 454 and passed to the RAID layer 360, which processes the new extent 470 for storage on SSD 260 within one or more stripes 464 of RAID group 466. The extent store instance may cooperate with the RAID layer 360 to identify a storage segment 460 (i.e., a portion of the storage array 150) and a location on SSD 260 within the segment 460 in which to store the new extent 470. Illustratively, the identified storage segment is a segment with a large contiguous free space having, e.g., location 490 on SSD 260b for storing the extent 470.

In an embodiment, the RAID layer 360 then writes the stripe 464 across the RAID group 466, illustratively as one or more full stripe writes 462. The RAID layer 360 may write a series of stripes 464 of sufficient depth to reduce data relocation that may occur within the flash-based SSDs 260 (i.e., flash block management). The extent store instance then (i) loads the SSD location 490 of the new extent 470 into the selected hash table 482n (i.e., as selected by the new candidate extent key), (ii) passes a new extent key (denoted as extent key 618) to the appropriate volume layer instance for storage within an entry (also denoted as volume metadata entry 600) of a dense tree 700 managed by that volume layer instance, and (iii) records a change to extent metadata of the selected hash table in the extent store layer log 355. Illustratively, the volume layer instance selects dense tree 700a spanning an offset range 440a of the volume 445 that encompasses the LBA range of the write request. As noted, the volume 445 (e.g., an offset space of the volume) is partitioned into multiple regions (e.g., allotted as disjoint offset ranges); in an embodiment, each region is represented by a dense tree 700. The volume layer instance then inserts the volume metadata entry 600 into the dense tree 700a and records a change corresponding to the volume metadata entry in the volume layer log 345. Accordingly, the I/O (write) request is sufficiently stored on SSD 260 of the cluster.

Read Path

Figure 5:
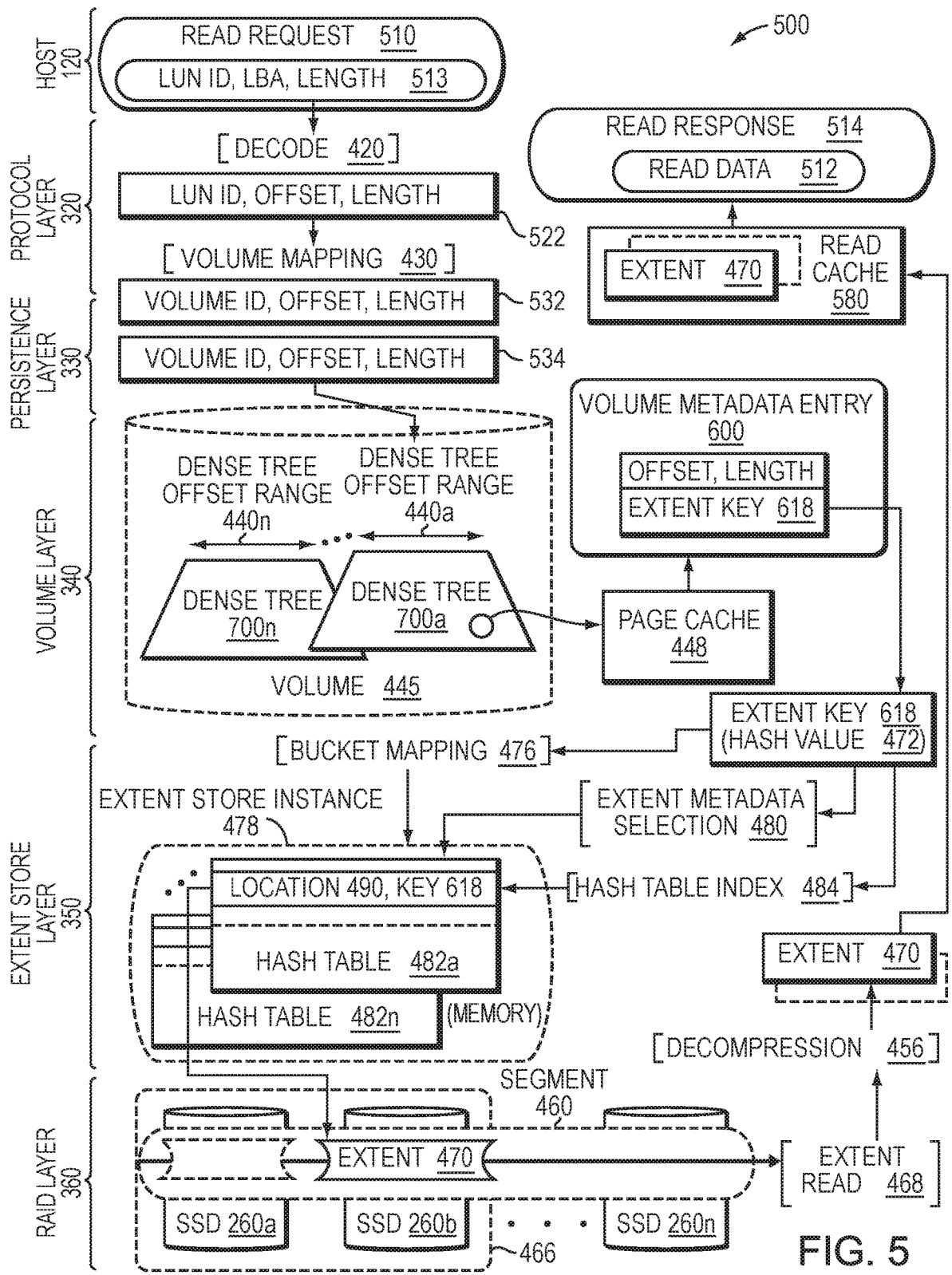
FIG. 5 illustrates a read path of the storage I/O stack.

FIG. 5 illustrates an I/O (e.g., read) path 500 of the storage I/O stack 300 for processing an I/O request, e.g., a SCSI read request 510. The read request 510 may be issued by host 120 and received at the protocol layer 320 of a node 200 in the cluster 100. Illustratively, the protocol layer 320 processes the read request by decoding 420 (e.g., parsing and extracting) fields of the request, e.g., LUN ID, LBA, and length (shown at 513), and uses the results 522, e.g., LUN ID, offset, and length, for the volume mapping technique 430. That is, the protocol layer 320 may implement the volume mapping technique 430 (described above) to translate the LUN ID and LBA range (i.e., equivalent offset and length) of the read request to an appropriate volume layer instance, i.e., volume ID (volume 445), in the cluster 100 that is responsible for managing volume metadata for the LBA (i.e., offset) range. The protocol layer then passes the results 532 to the persistence layer 330, which may search the write cache 380 to determine whether some or all of the read request can be serviced from its cached data. If the entire request cannot be serviced from the cached data, the persistence layer 330 may then pass the remaining portion of the request including, e.g., the volume ID, offset and length, as parameters 534 to the appropriate volume layer instance in accordance with the function shipping mechanism (e.g., RPC for inter-node communication) or the IPC mechanism (e.g., message threads, for intra-node communication).

The volume layer instance may process the read request to access a dense tree metadata structure (e.g., dense tree 700a) associated with a region (e.g., offset range 440a) of a volume 445 that encompasses the requested offset range (specified by parameters 534). The volume layer instance may further process the read request to search for (lookup) one or more volume metadata entries 600 of the dense tree 700a to obtain one or more extent keys 618 associated with one or more extents 470 within the requested offset range. As described further herein, each dense tree 700 may be embodied as a multiple levels of a search structure with possibly overlapping offset range entries at each level. The entries, i.e., volume metadata entries 600, provide mappings from host-accessible LUN addresses, i.e., LBAs, to durable extent keys. The various levels of the dense tree may have volume metadata entries 600 for the same offset, in which case the higher level has the newer entry and is used to service the read request. A top level of the dense tree 700 is illustratively resident in-core and a page cache 448 may be used to access lower levels of the tree. If the requested range or portion thereof is not present in the top level, a metadata page associated with an index entry at the next lower tree level is accessed. The metadata page (i.e., in the page cache 448) at the next level is then searched (e.g., a binary search) to find any overlapping entries. This process is then iterated until one or more volume metadata entries 600 of a level are found to ensure that the extent key(s) 618 for the entire requested read range are found. If no metadata entries exist for the entire or portions of the requested read range, then the missing portion(s) are zero filled.

Once found, each extent key 618 is processed by the volume layer 340 to, e.g., implement the bucket mapping technique 476 that translates the extent key to an appropriate extent store instance 478 responsible for storing the requested extent 470. Note that, in an embodiment, each extent key 618 is substantially identical to hash value 472 associated with the extent 470, i.e., the hash value as calculated during the write request for the extent, such that the bucket mapping 476 and extent metadata selection 480 techniques may be used for both write and read path operations. Note also that the extent key 618 may be derived from the hash value 472. The volume layer 340 may then pass the extent key 618 (i.e., the hash value 472 from a previous write request for the extent) to the appropriate extent store instance 478 (via an extent store get operation), which performs an extent key-to-SSD mapping to determine the location on SSD 260 for the extent.

In response to the get operation, the extent store instance may process the extent key 618 (i.e., hash value 472) to perform the extent metadata selection technique 480 that (i) selects an appropriate hash table (e.g., hash table 482a) from a set of hash tables within the extent store instance 478, and (ii) extracts a hash table index 484 from the extent key 618 (i.e., hash value 472) to index into the selected hash table and lookup a table entry having a matching extent key 618 that identifies a storage location 490 on SSD 260 for the extent 470. That is, the SSD location 490 mapped to the extent key 618 may be used to retrieve the existing extent (denoted as extent 470) from SSD 260 (e.g., SSD 260b). The extent store instance then cooperates with the RAID storage layer 360 to access the extent on SSD 260b and retrieve the data contents in accordance with the read request. Illustratively, the RAID layer 360 may read the extent in accordance with an extent read operation 468 and pass the extent 470 to the extent store instance. The extent store instance may then decompress the extent 470 in accordance with a decompression technique 456, although it will be understood to those skilled in the art that decompression can be performed at any layer of the storage I/O stack 300. The extent 470 may be stored in a buffer (not shown) in memory 220 and a reference to that buffer may be passed back through the layers of the storage I/O stack. The persistence layer may then load the extent into a read cache 580 (or other staging mechanism) and may extract appropriate read data 512 from the read cache 580 for the LBA range of the read request 510. Thereafter, the protocol layer 320 may create a SCSI read response 514, including the read data 512, and return the read response to the host 120.

Dense Tree Volume Metadata

As noted, a host-accessible LUN may be apportioned into multiple volumes, each of which may be partitioned into one or more regions, wherein each region is associated with a disjoint offset range, i.e., a LBA range, owned by an instance of the volume layer 340 executing on a node 200. For example, assuming a maximum volume size of 64 terabytes (TB) and a region size of 16 gigabytes (GB), a volume may have up to 4096 regions (i.e., 16 GB×4096=64 TB). In an embodiment, region 1 may be associated with an offset range of, e.g., 0-16 GB, region 2 may be associated with an offset range of 16 GB-32 GB, and so forth. Ownership of a region denotes that the volume layer instance manages metadata, i.e., volume metadata, for the region, such that I/O requests destined to an offset range within the region are directed to the owning volume layer instance. Thus, each volume layer instance manages volume metadata for, and handles I/O requests to, one or more regions. A basis for metadata scale-out in the distributed storage architecture of the cluster 100 includes partitioning of a volume into regions and distributing of region ownership across volume layer instances of the cluster.

Volume metadata, as well as data storage, in the distributed storage architecture is illustratively extent based. The volume metadata of a region that is managed by the volume layer instance is illustratively embodied as in memory (in-core) and on SSD (on-flash) volume metadata configured to provide mappings from host-accessible LUN addresses, i.e., LBAs, of the region to durable extent keys. In other words, the volume metadata maps LBA (i.e., offset) ranges of the LUN to data of the LUN (via extent keys) within the respective LBA range. In an embodiment, the volume layer organizes the volume metadata (embodied as volume metadata entries 600) as a data structure, i.e., a dense tree metadata structure (dense tree 700), which maps an offset range within the region to one or more extent keys. That is, LUN data (user data) stored as extents (accessible via extent keys) is associated with LUN offset (i.e., LBA) ranges represented as volume metadata (also stored as extents). Accordingly, the volume layer 340 contains computer executable instructions executed by the CPU 210 to perform operations that organize and manage the volume metadata entries of the dense tree metadata structure described herein.

Figure 6:
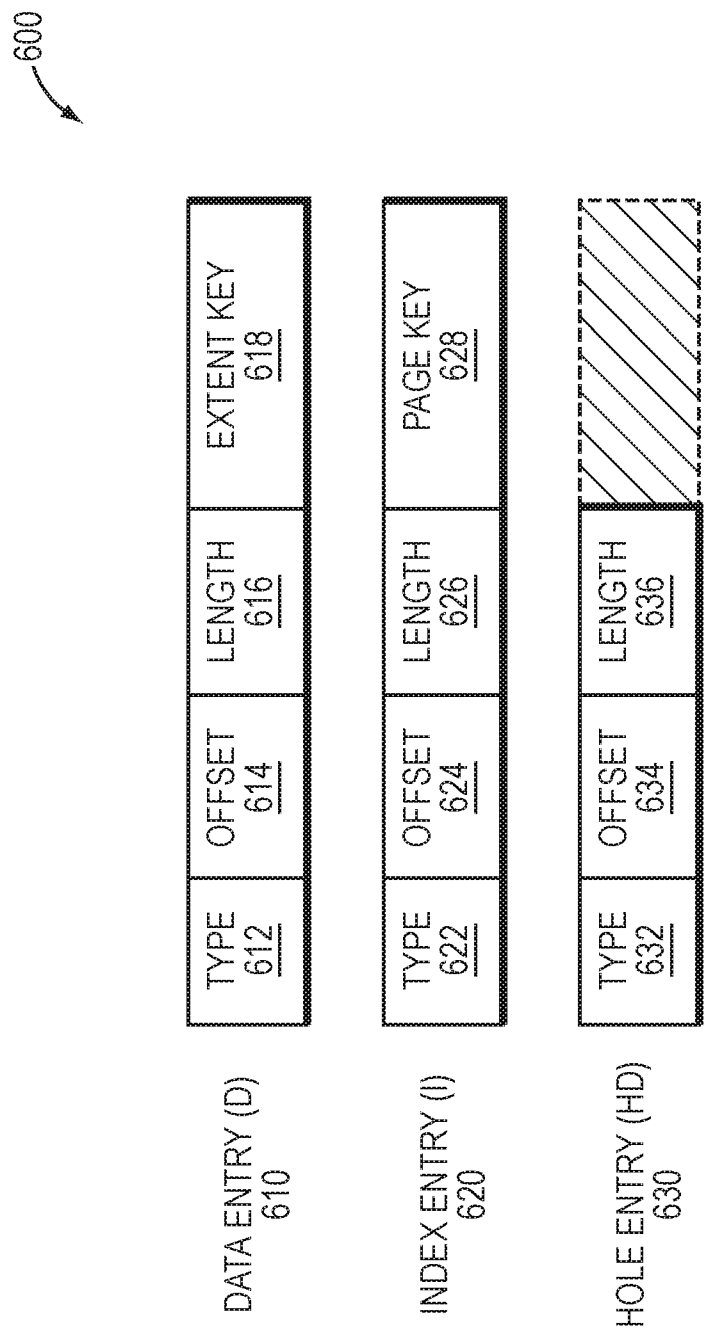
FIG. 6 is a block diagram of various volume metadata entries.

FIG. 6 is a block diagram of various volume metadata entries 600 of the dense tree metadata structure. Each volume metadata entry 600 of the dense tree 700 may be a descriptor that embodies one of a plurality of types, including a data entry (D) 610, an index entry (I) 620, and a hole entry (H) 630. The data entry (D) 610 is configured to map (offset, length) to an extent key for an extent (user data) and includes the following content: type 612, offset 614, length 616 and extent key 618. The index entry (I) 620 is configured to map (offset, length) to a page key (e.g., an extent key) of a metadata page (stored as an extent), i.e., a page containing one or more volume metadata entries, at a next lower level of the dense tree; accordingly, the index entry 620 includes the following content: type 622, offset 624, length 626 and page key 628. Illustratively, the index entry 620 manifests as a pointer from a higher level to a lower level, i.e., the index entry 620 essentially serves as linkage between the different levels of the dense tree. The hole entry (H) 630 represents absent data as a result of a hole punching operation at (offset, length) and includes the following content: type 632, offset 634, and length 636.

In an embodiment, the volume metadata entry types are of a fixed size (e.g., 12 bytes including a type field of 1 byte, an offset of 4 bytes, a length of 1 byte, and a key of 6 bytes) to facilitate search of the dense tree metadata structure as well as storage on metadata pages. Thus, some types may have unused portions, e.g., the hole entry 630 includes less information than the data entry 610 and so may have one or more unused bytes. In an alternative embodiment, the entries may be variable in size to avoid unused bytes. Advantageously, the volume metadata entries may be sized for in-core space efficiency (as well as alignment on metadata pages), which improves both read and write amplification for operations. For example, the length field (616, 626, 636) of the various volume metadata entry types may represent a unit of sector size, such as 512 bytes or 520 bytes, such that a 1 byte length may represent a range of 255×512 bytes=128K bytes.

Figure 7:
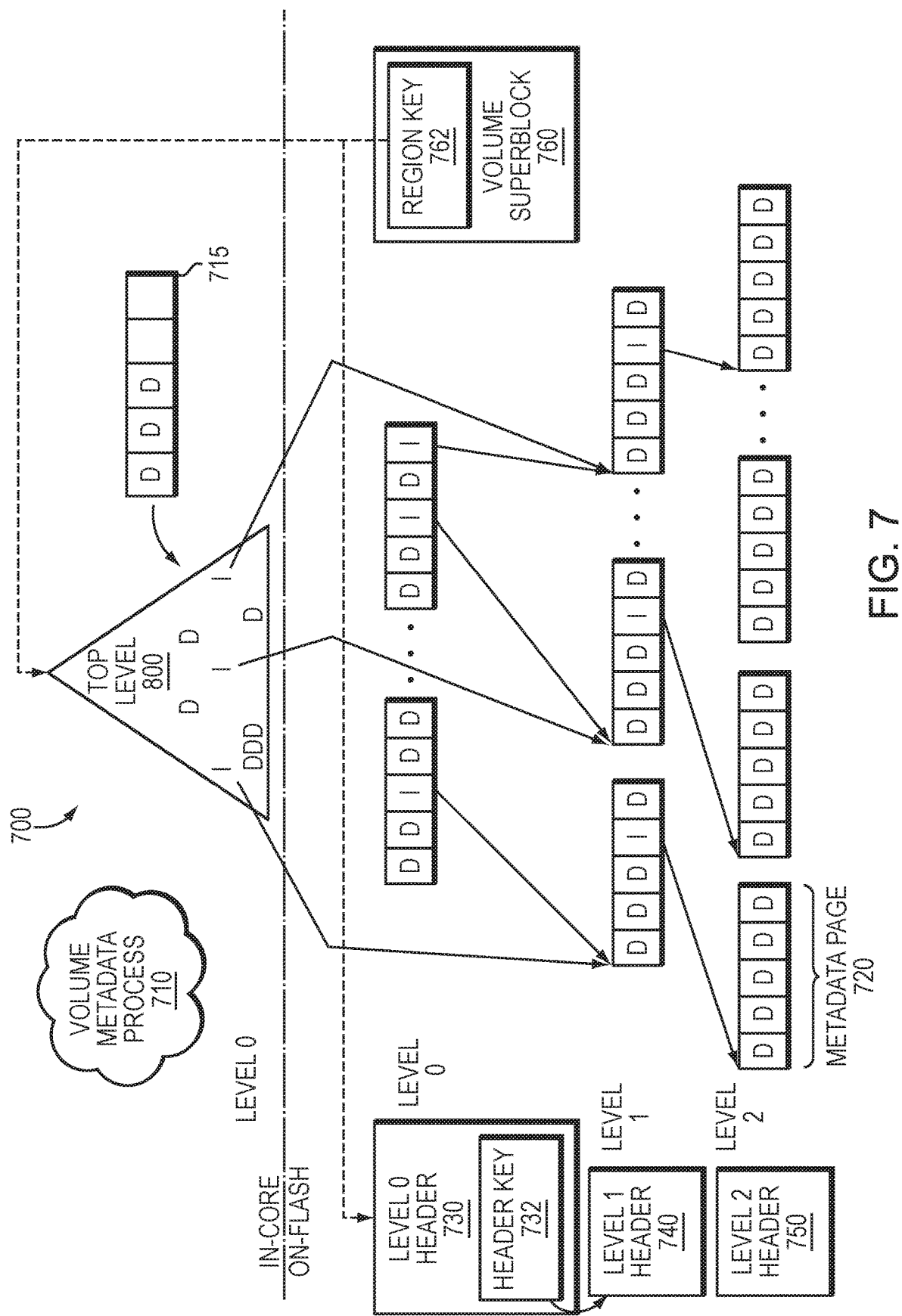
FIG. 7 is a block diagram of a dense tree metadata structure.

FIG. 7 is a block diagram of the dense tree metadata structure that may be advantageously used with one or more embodiments described herein. The dense tree metadata structure 700 is configured to provide mappings of logical offsets within a LUN (or volume) to extent keys managed by one or more extent store instances. Illustratively, the dense tree metadata structure is organized as a multi-level dense tree 700, where a top level 800 represents recent volume metadata changes and subsequent descending levels represent older changes. Specifically, a higher level of the dense tree 700 is updated first and, when that level fills, an adjacent lower level is updated, e.g., via a merge operation. A latest version of the changes may be searched starting at the top level of the dense tree and working down to the descending levels. Each level of the dense tree 700 includes fixed size records or entries, i.e., volume metadata entries 600, for storing the volume metadata. A volume metadata process 710 illustratively maintains the top level 800 of the dense tree in memory (in-core) as a balanced tree that enables indexing by offsets. The volume metadata process 710 also maintains a fixed sized (e.g., 4 KB) in-core buffer as a staging area (i.e., an in-core staging buffer 715) for volume metadata entries 600 inserted into the balanced tree (i.e., top level 800). Each level of the dense tree is further maintained on-flash as a packed array of volume metadata entries, wherein the entries are stored as extents illustratively organized as fixed sized (e.g., 4 KB) metadata pages 720. Notably, the staging buffer 715 is de-staged to SSD upon a trigger, e.g., the staging buffer is full. Each metadata page 720 has a unique identifier (ID), which guarantees that no two metadata pages can have the same content. Illustratively, metadata may not be de-duplicated by the extent store layer 350.

In an embodiment, the multi-level dense tree 700 includes three (3) levels, although it will be apparent to those skilled in the art that additional levels N of the dense tree may be included depending on parameters (e.g., size) of the dense tree configuration. Illustratively, the top level 800 of the tree is maintained in-core as level 0 and the lower levels are maintained on-flash as levels 1 and 2. In addition, copies of the volume metadata entries 600 stored in staging buffer 715 may also be maintained on-flash as, e.g., a level 0 linked list. A leaf level, e.g., level 2, of the dense tree contains data entries 610, whereas a non-leaf level, e.g., level 0 or 1, may contain both data entries 610 and index entries 620. Each index entry (I) 620 at level N of the tree is configured to point to (reference) a metadata page 720 at level N+1 of the tree. Each level of the dense tree 600 also includes a header (e.g., level 0 header 730, level 1 header 740 and level 2 header 750) that contains per level information, such as reference counts associated with the extents. Each upper level header contains a header key (an extent key for the header, e.g., header key 732 of level 0 header 730) to a corresponding lower level header. A region key 762 to a root, e.g., level 0 header 730 (and top level 800), of the dense tree 700 is illustratively stored on-flash and maintained in a volume root extent, e.g., a volume superblock 760. Notably, the volume superblock 760 contains region keys to the roots of the dense tree metadata structures for all regions in a volume.

Figure 8:
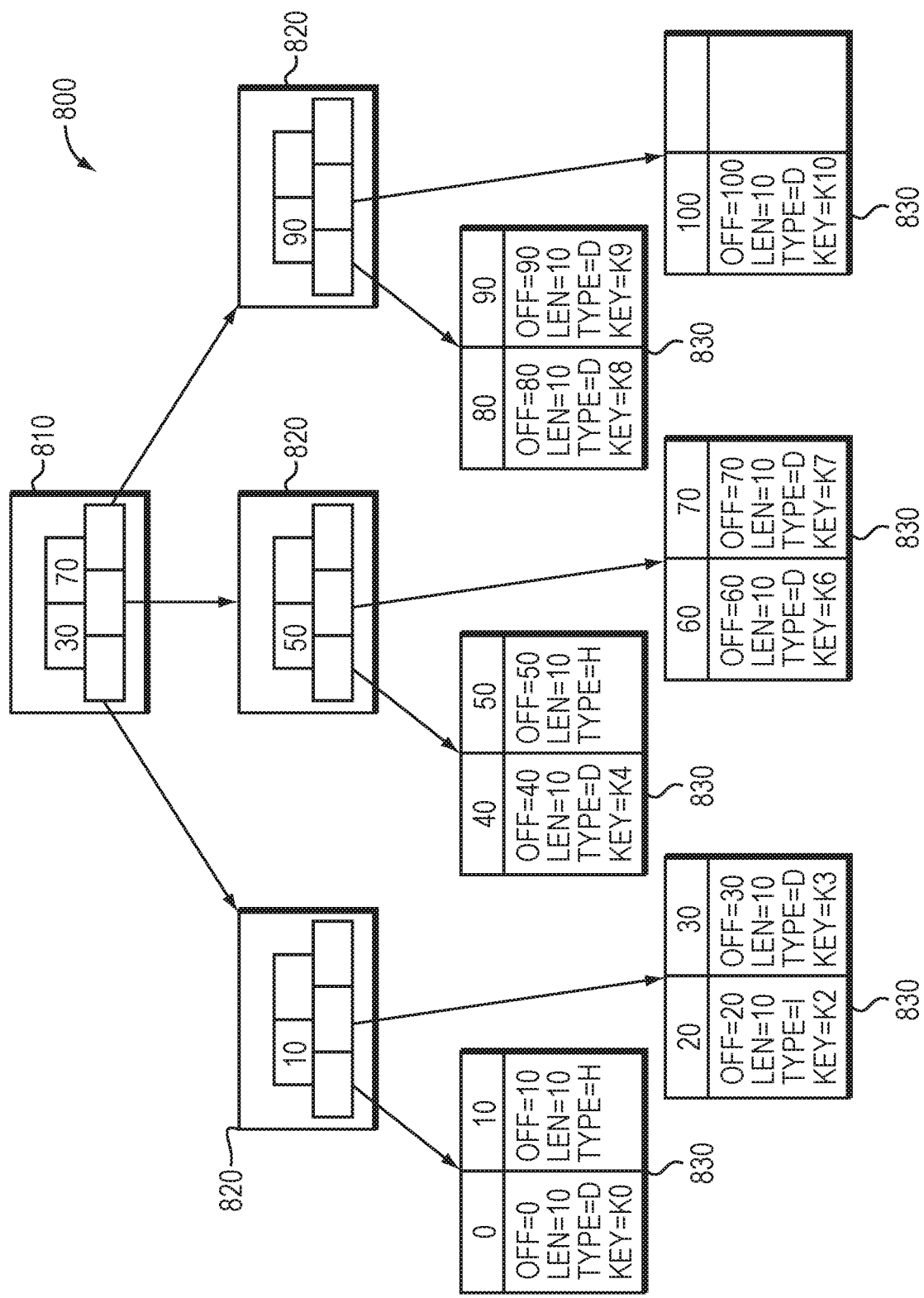
FIG. 8 is a block diagram of a top level of the dense tree metadata structure.

FIG. 8 is a block diagram of the top level 800 of the dense tree metadata structure. As noted, the top level (level 0) of the dense tree 700 is maintained in-core as a balanced tree, which is illustratively embodied as a B+tree data structure. However, it will be apparent to those skilled in the art that other data structures, such as AVL trees, Red-Black trees, and heaps (partially sorted trees), may be advantageously used with the embodiments described herein. The B+tree (top level 800) includes a root node 810, one or more internal nodes 820 and a plurality of leaf nodes (leaves) 830. The volume metadata stored on the tree is preferably organized in a manner that is efficient both to search, in order to service read requests and to traverse (walk) in ascending order of offset to accomplish merges to lower levels of the tree. The B+tree has certain properties that satisfy these requirements, including storage of all data (i.e., volume metadata entries 600) in leaves 830 and storage of the leaves as sequentially accessible, e.g., as one or more linked lists. Both of these properties make sequential read requests for write data (i.e., extents) and read operations for dense tree merge more efficient. Also, since it has a much higher fan-out than a binary search tree, the illustrative B+tree results in more efficient lookup operations. As an optimization, the leaves 830 of the B+tree may be stored in a page cache 448, making access of data more efficient than other trees. In addition, resolution of overlapping offset entries in the B+tree optimizes read requests of extents. Accordingly, the larger the fraction of the B+tree (i.e., volume metadata) maintained in-core, the less loading (reading) of metadata from SSD is required so as to reduce read amplification.

Figure 9:
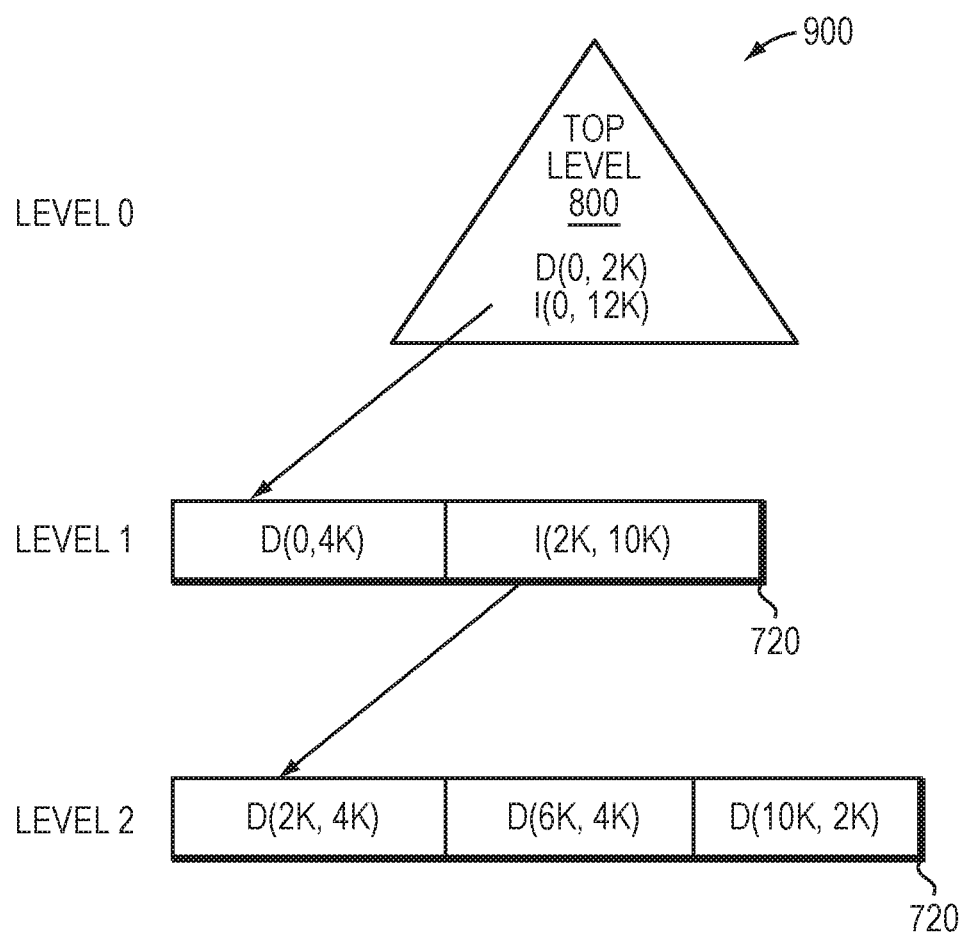
FIG. 9 illustrates mapping between levels of the dense tree metadata structure.

FIG. 9 illustrates mappings 900 between levels of the dense tree metadata structure. Each level of the dense tree 700 includes one or more metadata pages 720, each of which contains multiple volume metadata entries 600. As noted, each volume metadata entry 600 has a fixed size, e.g., 12 bytes, such that a predetermined number of entries may be packed into each metadata page 720. The data entry (D) 610 is a map of (offset, length) to an address of (user) data which is retrievable using an extent key 618 (i.e., from an extent store instance). The (offset, length) illustratively specifies an offset range of a LUN. The index entry (I) 620 is a map of (offset, length) to a page key 628 of a metadata page 720 at the next lower level. Illustratively, the offset in the index entry (I) 620 is the same as the offset of the first entry in the metadata page 720 at the next lower level. The length 626 in the index entry 620 is illustratively the cumulative length of all entries in the metadata page 720 at the next lower level (including gaps between entries).

For example, the metadata page 720 of level 1 includes an index entry "I(2K,10K)" that specifies a starting offset 2K and an ending offset 12K (i.e., 12K=2K+10K); the index entry (I) illustratively points to a metadata page 720 of level 2 covering the specified range. An aggregate view of the data entries (D) packed in the metadata page 720 of level 2 covers the mapping from the smallest offset (e.g., 2K) to the largest offset (e.g., 12K). Thus, each level of the dense tree 700 may be viewed as an overlay of an underlying level. For instance the data entry "D(0,4K)" of level 1 overlaps 2K of the underlying metadata in the page of level 2 (i.e., the range 2K,4K).

Figure 10:
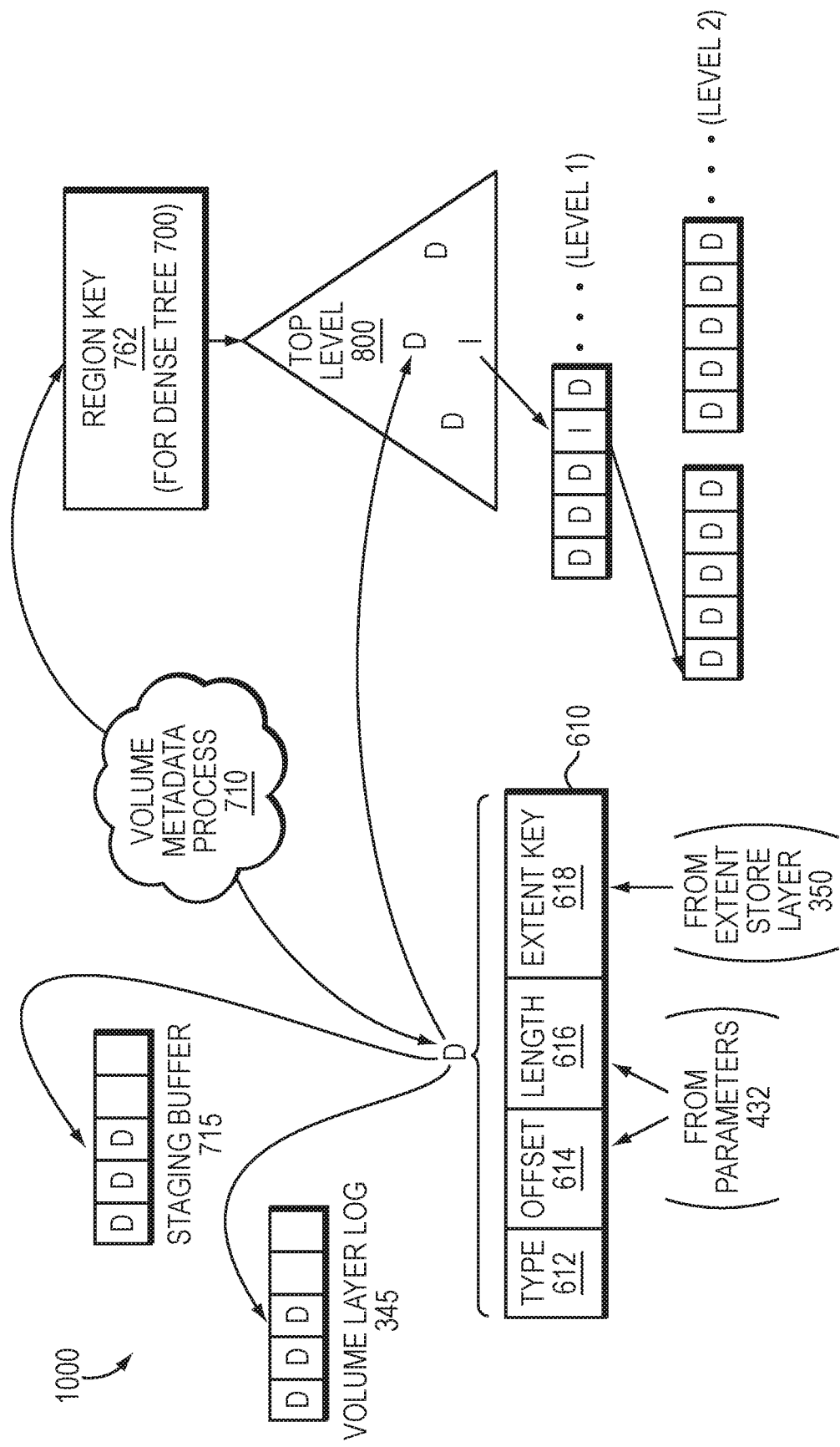
FIG. 10 illustrates a workflow for inserting a volume metadata entry into the dense tree metadata structure in accordance with a write request.

In one or more embodiments, operations for volume metadata managed by the volume layer 340 include insertion of volume metadata entries, such as data entries 610, into the dense tree 700 for write requests. As noted, each dense tree 700 may be embodied as multiple levels of a search structure with possibly overlapping offset range entries at each level, wherein each level is a packed array of entries (e.g., sorted by offset) and where leaf entries have an offset range (offset, length) an extent key. FIG. 10 illustrates a workflow 1000 for inserting a volume metadata entry into the dense tree metadata structure in accordance with a write request. In an embodiment, volume metadata updates (changes) to the dense tree 700 occur first at the top level of the tree, such that a complete, top-level description of the changes is maintained in memory 220.

Operationally, the volume metadata process 710 applies the region key 762 to access the dense tree 700 (i.e., top level 800) of an appropriate region (e.g., offset range 440 as determined from the parameters 432 derived from a write request 410). Upon completion of a write request, the volume metadata process 710 creates a volume metadata entry, e.g., a new data entry 610, to record a mapping of offset/length-to-extent key (i.e., offset range-to-user data). Illustratively, the new data entry 610 includes an extent key 618 (i.e., from the extent store layer 350) associated with data (i.e., extent 470) of the write request 410, as well as offset 614 and length 616 (i.e., from the write parameters 432) and type 612 (i.e., data entry D). The volume metadata process 710 then updates the volume metadata by inserting (adding) the data entry D into the level 0 staging buffer 715, as well as into the top level 800 of dense tree 700 and the volume layer log 345, thereby signifying that the write request is stored on the storage array 150.

Dense Tree Volume Metadata Checkpointing

When a level of the dense tree 700 is full, volume metadata entries 600 of the level are merged with the next lower level of the dense tree. As part of the merge, new index entries 620 are created in the level to point to new lower level metadata pages 720, i.e., data entries from the level are merged (and pushed) to the lower level so that they may be "replaced" with an index reference in the level. The top level 800 (i.e., level 0) of the dense tree 700 is illustratively maintained in-core such that a merge operation to level 1 facilitates a checkpoint to SSD 260. The lower levels (i.e., levels 1 and/or 2) of the dense tree are illustratively maintained on-flash and updated (e.g., merged) as a batch operation (i.e., processing the entries of one level with those of a lower level) when the higher levels are full. The merge operation illustratively includes a sort, e.g., a 2-way merge sort operation. A parameter of the dense tree 700 is the ratio K of the size of level N−1 to the size of level N. Illustratively, the size of the array at level N is K times larger than the size of the array at level N−1, i.e., sizeof(level N)=K*sizeof(level N−1). After K merges from level N−1, level N becomes full (i.e., all entries from a new, fully-populated level N−1 are merged with level N, iterated K times.)

Figure 11:
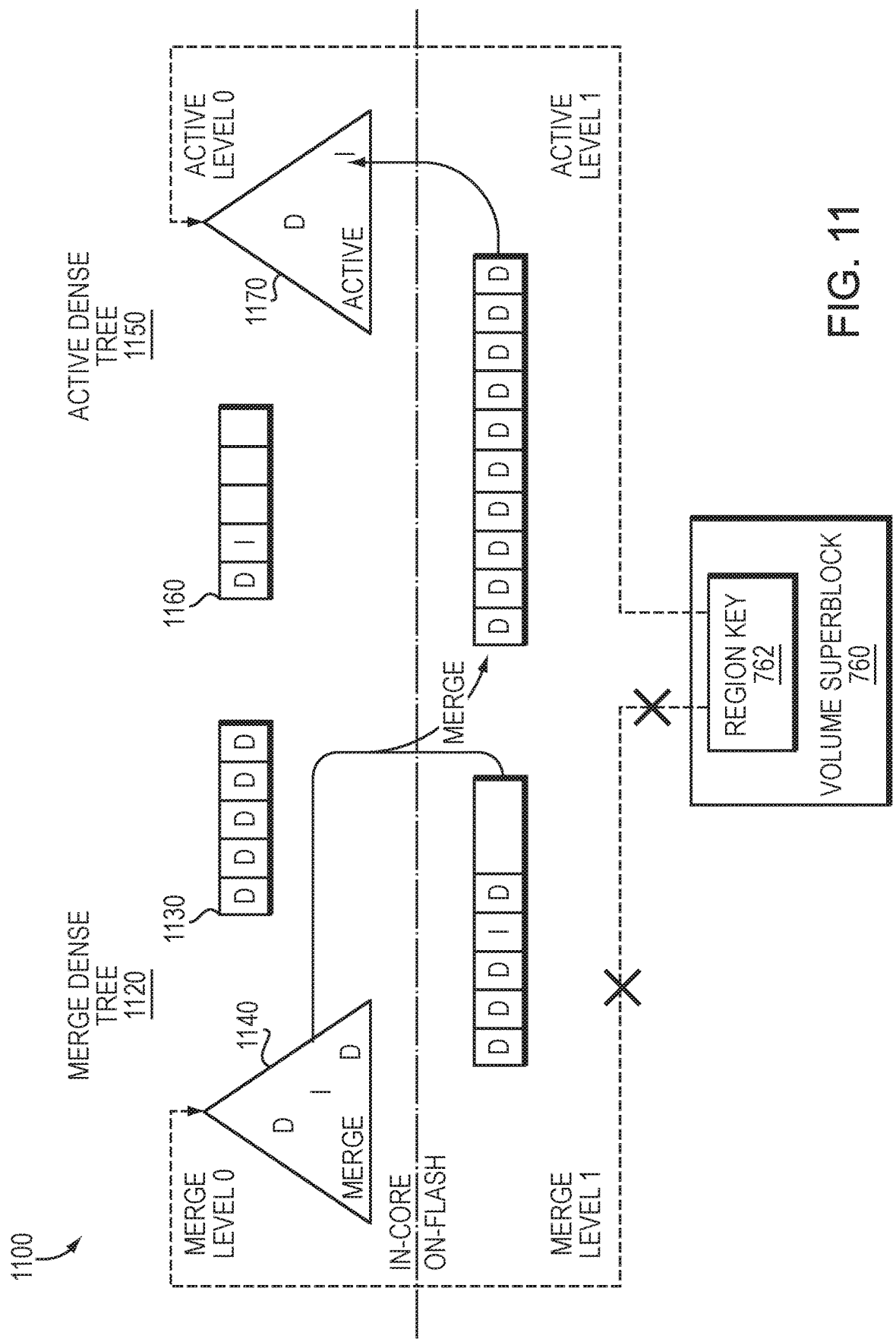
FIG. 11 illustrates merging between levels of the dense tree metadata structure.

FIG. 11 illustrates merging 1100 between levels, e.g., levels 0 and 1, of the dense tree metadata structure. In an embodiment, a merge operation is triggered when level 0 is full. When performing the merge operation, the dense tree metadata structure transitions to a "merge" dense tree structure (shown at 1120) that merges, while an alternate "active" dense tree structure (shown at 1150) is utilized to accept incoming data. Accordingly, two in-core level 0 staging buffers 1130, 1160 are illustratively maintained for concurrent merge and active (write) operations, respectively. In other words, an active staging buffer 1160 and active top level 1170 of active dense tree 1150 handle in-progress data flow (i.e., active user read and write requests), while a merge staging buffer 1130 and merge top level 1140 of merge dense tree 1120 handle consistency of the data during a merge operation. That is, a "double buffer" arrangement may be used to handle the merge of data (i.e., entries in the level 0 of the dense tree) while processing active operations.

During the merge operation, the merge staging buffer 1130, as well as the top level 1140 and lower level array (e.g., merge level 1) are read-only and are not modified. The active staging buffer 1160 is configured to accept the incoming (user) data, i.e., the volume metadata entries received from new put operations are loaded into the active staging buffer 1160 and added to the top level 1170 of the active dense tree 1150. Illustratively, merging from level 0 to level 1 within the merge dense tree 1120 results in creation of a new active level 1 for the active dense tree 1150, i.e., the resulting merged level 1 from the merge dense tree is inserted as a new level 1 into the active dense tree. A new index entry I is computed to reference the new active level 1 and the new index entry I is loaded into the active staging buffer 1160 (as well as in the active top level 1170). Upon completion of the merge, the region key 762 of volume superblock 760 is updated to reference (point to) the root, e.g., active top level 1170 and active level 0 header (not shown), of the active dense tree 1150, thereby deleting (i.e., rendering inactive) merge level 0 and merge level 1 of the merge dense tree 1120. The merge staging buffer 1130 (and the top level 1140 of the dense tree) thus becomes an empty inactive buffer until the next merge. The merge data structures (i.e., the merge dense tree 1120 including staging buffer 1130) may be maintained in-core and "swapped" as the active data structures at the next merge (i.e., "double buffered").

Figure 12:
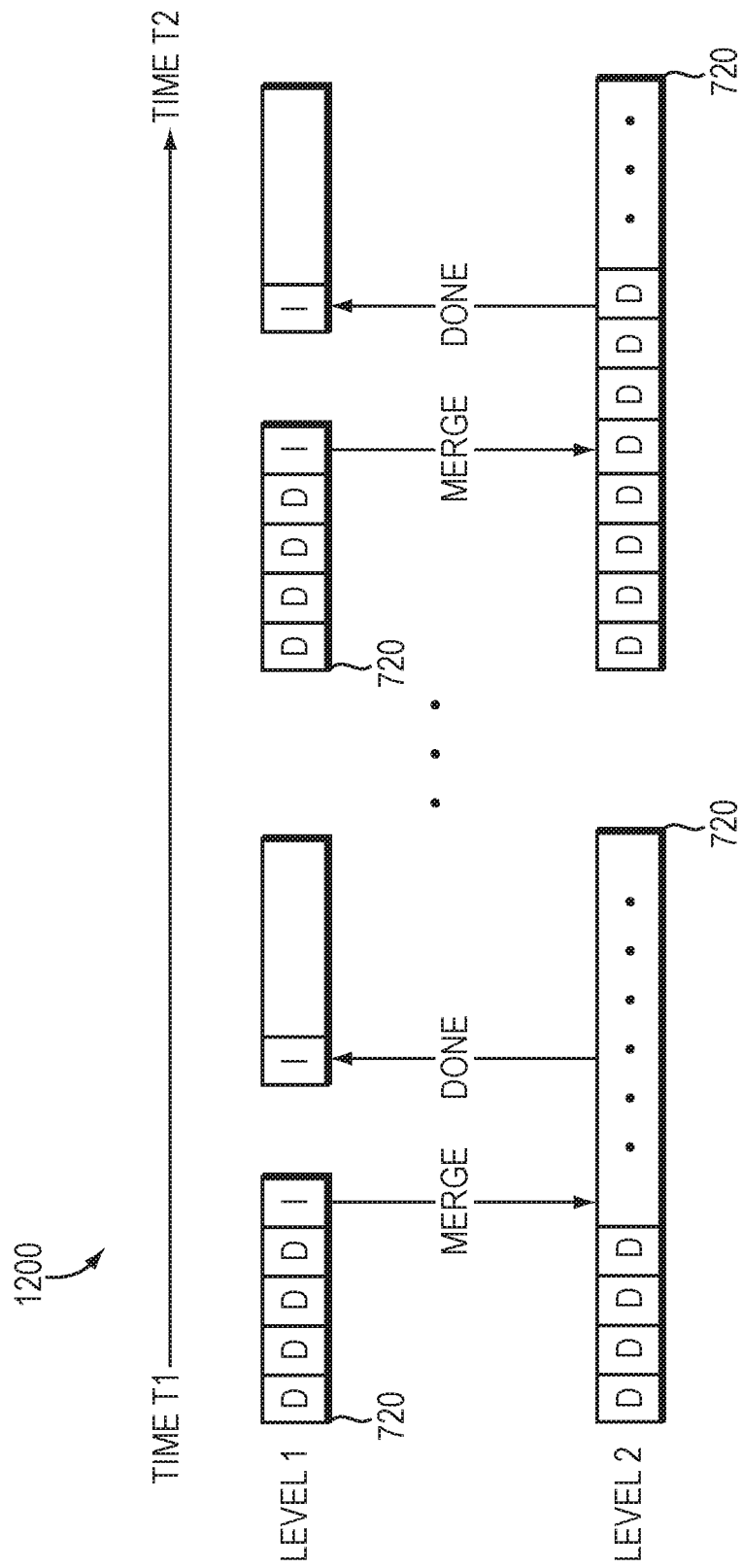
FIG. 12 illustrates batch updating between levels of the dense tree metadata structure.

FIG. 12 illustrates batch updating 1200 between lower levels, e.g., levels 1 and 2, of the dense tree metadata structure. Illustratively, as an example, a metadata page 720 of level 1 includes four data entries D and an index entry I referencing a metadata page 720 of level 2. When full, level 1 batch updates (merges) to level 2, thus emptying the data entries D of level 1, i.e., contiguous data entries are combined (merged) and pushed to the next lower level with a reference inserted in their place in the level. The merge of changes of layer 1 into layer 2 illustratively produces a new set of extents on SSD, i.e., new metadata pages are also stored, illustratively, in an extent store instance. As noted, level 2 is illustratively several times larger, e.g., K times larger, than level 1 so that it can support multiple merges. Each time a merge is performed, some older entries that were previously on SSD may be deleted. Advantageously, use of the multi-level tree structure lowers the overall frequency of volume metadata that is rewritten (and hence reduces write amplification), because old metadata may be maintained on a level while new metadata is accumulated in that level until it is full. Further, when a plurality of upper levels become full, a multi-way merge to a lower level may be performed (e.g., a three-way merge from full levels 0 and 1 to level 2).

Figure 13:
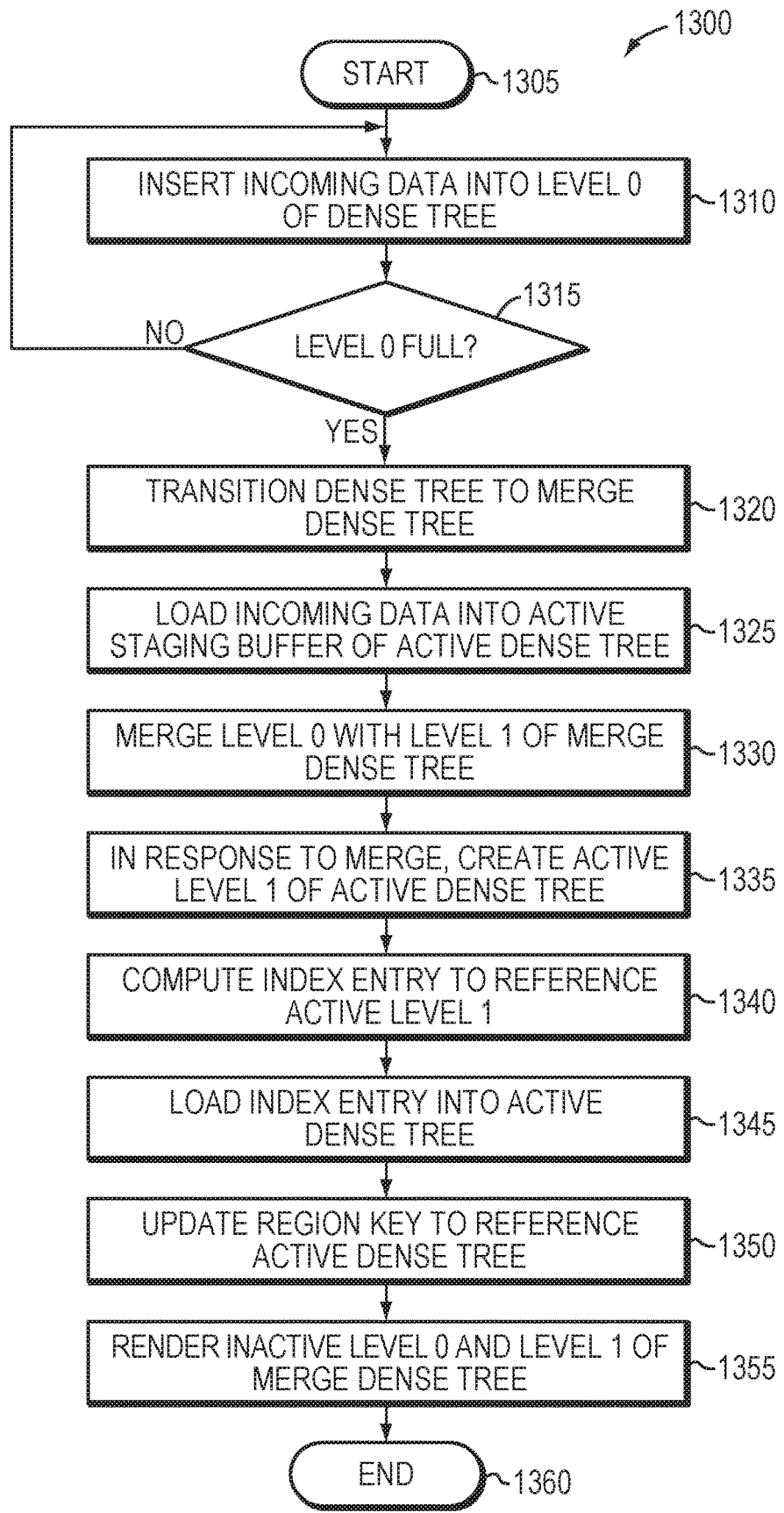
FIG. 13 is an example simplified procedure for merging between levels of the dense tree metadata structure.

FIG. 13 is an example simplified procedure 1300 for merging between levels of the dense tree metadata structure. The procedure starts at step 1305 and proceeds to step 1310 where incoming data received at the dense tree metadata structure is inserted into level 0, i.e., top level 800, of the dense tree. Note that the incoming data is inserted into the top level 800 as a volume metadata entry. At step 1315, a determination is made as whether level 0, i.e., top level 800, of the dense tree is rendered full. If not, the procedure returns to step 1310; otherwise, if the level 0 is full, the dense tree transitions to a merge dense tree structure at step 1320. At step 1325, incoming data is loaded into an active staging buffer of an active dense tree structure and, at step 1330, the level 0 merges with level 1 of the merge dense tree structure. In response to the merge, a new active level 1 is created for the active dense tree structure at step 1335. At step 1340, an index entry is computed to reference the new active level 1 and, at step 1345, the index entry is loaded into the active dense tree structure. At step 1350, a region key of a volume superblock is updated to reference the active dense tree structure and, at step 1355, the level 0 and level 1 of the merge dense tree structure are rendered inactive (alternatively, deleted). The procedure then ends at step 1360.

In an embodiment, as the dense tree fills up, the volume metadata is written out to one or more files on SSD in a sequential format, independent of when the volume layer log 345 is de-staged and written to SSD 260, i.e., logging operations may be independent of merge operations. When writing volume metadata from memory 220 to SSD, direct pointers to the data, e.g., in-core references to memory locations, may be replaced with pointers to an index block in the file that references a location where the metadata can be found. As the files are accumulated, they are illustratively merged together in a log-structured manner that continually writes the metadata sequentially to SSD. As a result, the lower level files grow and contain volume metadata that may be outdated because updates have occurred to the metadata, e.g., newer entries in the dense tree may overlay older entries, such as a hole entry overlaying an underlying data entry. The updates (i.e., layered LBA ranges) are "folded" into the lower levels, thereby overwriting the outdated metadata. The resulting dense tree structure thus includes newly written metadata and "holes" where outdated metadata has been deleted.

Dense Tree Volume Metadata Logging

In an embodiment, the volume layer log 345 is a two level, append-only logging structure, wherein the first level is NVRAM 280 (embodied as NVLogs 285) and the second level is SSD 260, e.g., stored as extents. New volume metadata entries 600 inserted into level 0 of the dense tree are also recorded in the volume layer log 345 of NVLogs 285. When there are sufficient entries in the volume layer log 345, e.g., when the log 345 is full or exceeds a threshold, the volume metadata entries are flushed (written) from log 345 to SSD 260 as one or more extents 470. Multiple extents may be linked together with the volume superblock 760 holding a key (i.e., an extent key) to the head of the list. In the case of recovery, the volume layer log 345 is read back to memory 220 to reconstruct the in-core top level 800 (i.e., level 0) of dense tree 700. Other levels may be demand paged via the page cache 448, e.g., metadata pages of level 1 are loaded and read as needed.

Figure 14:
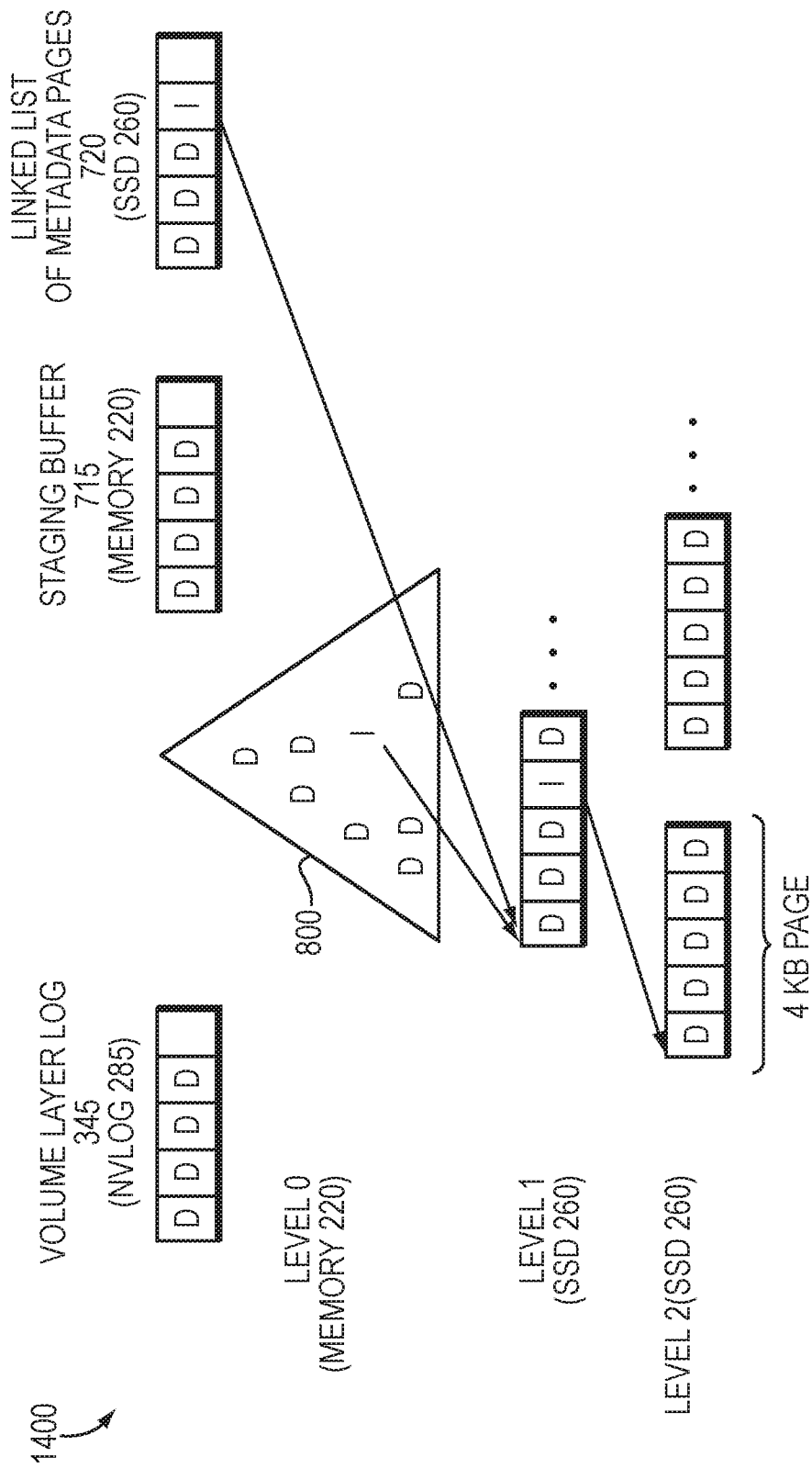
FIG. 14 illustrates volume logging of the dense tree metadata structure.

FIG. 14 illustrates volume logging 1400 of the dense tree metadata structure. Copies of the volume metadata entries 600 stored in level 0 of the dense tree are maintained in persistent storage (SSD 260) and recorded as volume layer log 345 in, e.g., NVLogs 285. Specifically, the entries of level 0 are stored in the in-core staging buffer 715, logged in the append log (volume layer log 345) of NVLogs 285 and thereafter flushed to SSD 260 as a linked list of metadata pages 720. Copies of the level 0 volume metadata are maintained in-core as the active dense tree level 0 so as to service incoming read requests from memory 220. Illustratively, the in-core top level 800 (e.g., active dense tree level 0 1170) may be used as a cache (for hot metadata), whereas the volume metadata stored on the other lower levels of the dense tree are accessed less frequently (cold data) and maintained on SSD. Alternatively, the lower levels also may be cached using the page cache 448.

Dense Tree Volume Metadata Update

Figure 15:
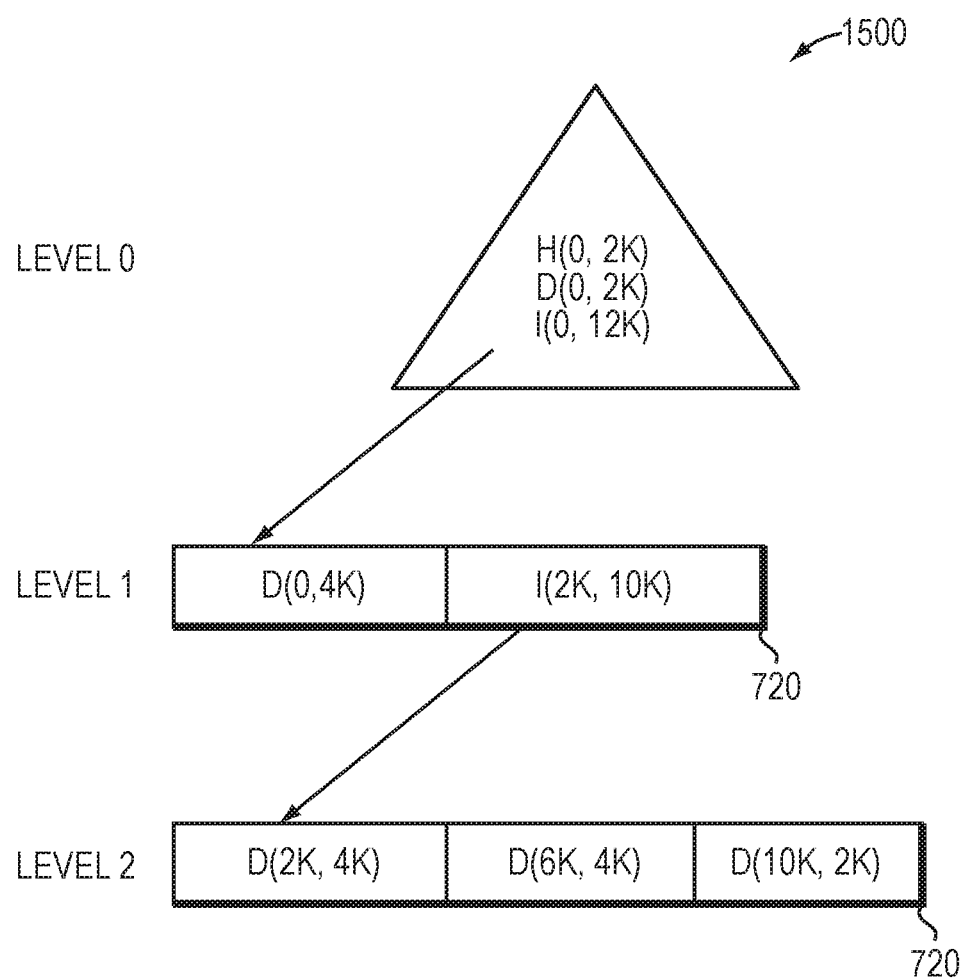
FIG. 15 illustrates a workflow for deleting a volume metadata entry from the dense tree metadata structure in accordance with a delete request.

In an embodiment, deletion of a particular data range, e.g., of a LUN, is represented as a hole punch and manifested as a hole entry (H) 630. FIG. 15 illustrates a workflow 1500 for deleting one or more volume metadata entries from the dense tree metadata structure in accordance with a delete request. Assume it is desirable to punch a hole (delete) of a data range 0-12K as represented by hole entry H(0-12K) (offset, length). The entry D(0,2K) is deleted from level 0, with updates to the lower levels occurring in a fashion similar to write requests. That is, the volume layer 340 of the storage I/O stack 300 waits until a merge operation to resolve any overlaps between different levels by, e.g., overwriting the older entries with the newer entries. In this example, the hole entry H for 0-12K range is recent, so when that entry is merged to a lower level, e.g., level 1, the data entries D with corresponding (i.e., overlapping) ranges are deleted. In other words, the hole entry H cancels out any data entries D that happen to previously be in the corresponding range. Thus when level 0 is full and merged with level 1, the data entry D(0,4K)(offset, length) is deleted from level 1, and when level 1 is full and merged with level 2, the data entries D(2K,4K), D(6K,4K) and D(10K,2K) are deleted, i.e., the hole H(0, 12K) overlays the underlying disjoint data entries D(2K, 4K)(offset, length), D(6K, 4K), D(10K, 2K).

Deferred Reference Count Update

In an embodiment, a deferred reference count update technique efficiently frees storage space for metadata (associated with data) to be deleted during a merge operation managed by the volume layer. As previously noted, the metadata is illustratively volume metadata embodied as mappings from LBAs of a LUN to extent keys maintained by the extent store layer. The volume layer organizes the volume metadata as a mapping data structure, i.e., a multi-level dense tree, where each level of the dense tree may include volume metadata entries for storing the volume metadata. Each level of the dense tree includes one or more metadata pages, each of which contains multiple volume metadata entries that provide the mappings from the host-accessible LBAs to the extent keys. Each metadata page is also stored as an extent and, thus, includes a page key (e.g., an extent key). When a level of the dense tree is full, the existing volume metadata entries of the level are merged with the next lower level of the dense tree. As part of the merge, new index entries are created in the level to point to new lower level metadata pages, i.e., data entries from the level are merged (and pushed) to the lower level so that they may be replaced with an index reference in the level. As a result, the existing (i.e., older) volume metadata entries of the level are no longer needed and, thus, are subject to deletion. That is, the metadata pages having the older (i.e., merged and no longer needed) volume metadata entries may be deleted. Notably, a merger of any entry in a metadata page renders that metadata page subject to deletion.

Figure 16:
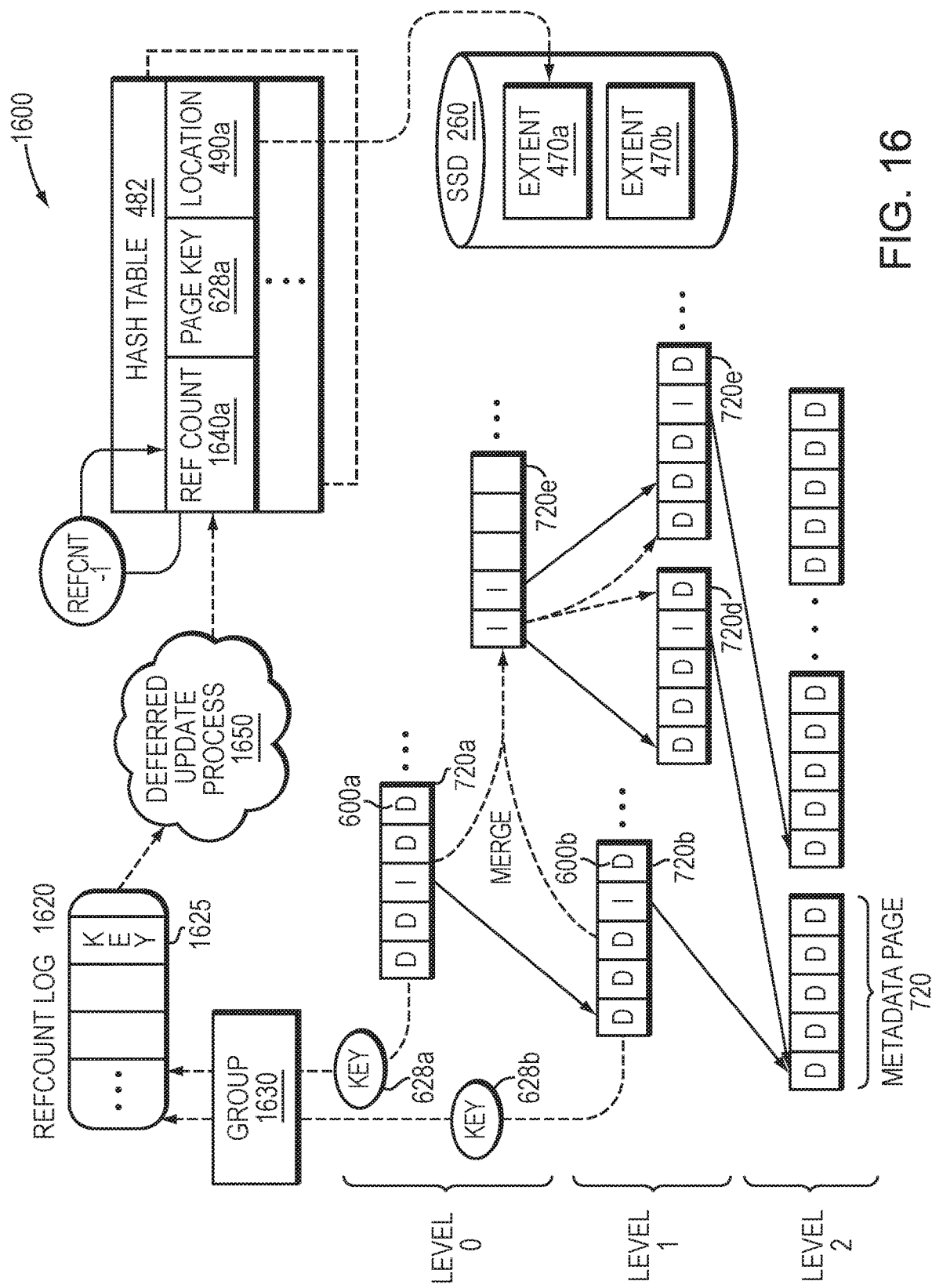
FIG. 16 illustrates a deferred reference count update technique.

FIG. 16 illustrates the deferred reference count update technique 1600 which may apply to deletion of the entire LUN or portion of the LUN, including overwrite of the LBA range (i.e., offset range) within the LUN, wherein one or more existing volume metadata entries 600 (i.e., LBA-to-extent key mappings) are deleted. According to the deferred reference count update technique, one or more requests to delete volume metadata entries 600a,b may be represented as page (metadata) keys 628a,b associated with metadata pages 720a,b having those volume metadata entries during the merge operation. Accordingly, the storage space associated with those metadata pages may be freed in an out-of-band fashion (i.e., not during the merge). Illustratively, the page keys 628a,b of the metadata pages 720a,b may be persistently recorded in a set of data structures embodied as a reference count (refcount) log 1620 (e.g., a circular log) to thereby allow the merge operation to complete without resolving deletion (e.g., reference count reduction) of the keys (and, thus, freeing of the space of the extents 470a,b on SSD storing the metadata pages 720a,b associated with the page keys 628a,b). Note that key deletion may occur when a reference count 1640a associated with the page key 628a reduces to a sentinel value (e.g., zero).

A batch (i.e., group) of page keys 1630 (i.e., associated with the metadata pages 720a,b to be deleted) may be organized as one or more delete requests 1625 and inserted into the refcount log 1620 by the volume layer in a manner that maintains concurrency. During the merge operation, existing metadata pages 720a,b of, e.g., a top level (metadata page 720a) and a next level (metadata page 720b) of the dense tree may be deleted and rewritten as new metadata pages 720c,d,e. The page keys of the batch 1630 of the existing metadata pages 720a,b may be organized, e.g., in memory, as one or more pending delete requests. Note that the reference count log may support increments (duplicates) of pages as well as decrements (deletion requests). Once the merge operation completes, the page keys 628a,b of the delete requests may be inserted into the refcount log. That is, batches of one or more keys may be inserted into the refcount log per batch on a key-by-key basis. Subsequently, a deferred reference count update process 1650 may be spawned (instantiated) to "walk" through the page keys stored in the refcount log and delete (i.e., reference count reduce) each key, e.g., from the extent store layer 350, independently and out-of-band from the merge operation. Note also that only the key is needed for deletion in the extent store layer which need only dereference (i.e., dissociate) the key with the extent. Illustratively, the extent store layer may effect deletion (e.g., reference count of zero) for each key by clearing a corresponding entry in the hash table 482, thereby dereferencing the extent (e.g., 470a) storing the metadata page (e.g., 720a) associated with the key (e.g., 628a). Note further that locations of identical metadata pages (e.g., during restart of a merge operation) may also directly replace locations 490 in the hash tables 482 associated with prior metadata pages and avoid extent hashing 474 (i.e., avoid hashing again the identical metadata page).

Figure 17:
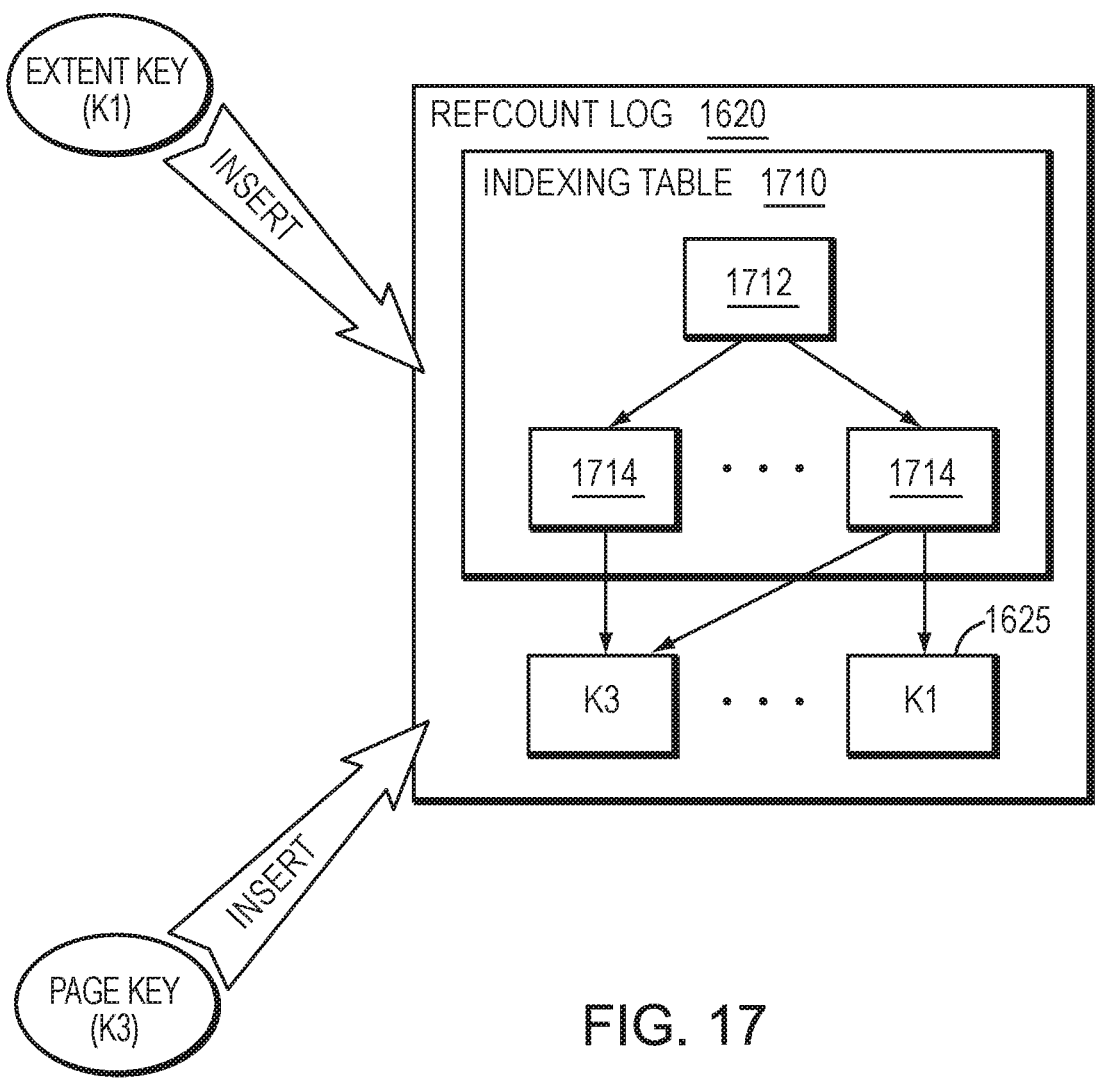
FIG. 17 illustrates insertion into a reference count log.

FIG. 17 illustrates insertion into the refcount log. In an embodiment, the refcount log 1620 may be maintained on SSD as a multi-level indexing table 1710, where a top-level 1712 of the log indexes a group of pointers at a lower level 1714 and the group of pointers at the lower level indexes one or more keys stored at a lowest level of the log (i.e., delete requests 1625). The multi-level indexing table provides an efficient way to insert (i.e., store) the keys for subsequent deletion in a deferred fashion. That is, the multiple levels of the refcount log enable efficient storage of a substantial number of keys, e.g., through indexing, although other metadata structures (such as linked lists) may be used. The data structure may accommodate grouping of links 1716a,b to a common (same) batch of keys to exploit batch-by-batch processing of keys. As noted, insertion of deletion requests into the refcount log 1620 for metadata pages (i.e., page keys) supports idempotent merge operations. That is, each metadata page should be deleted only once by the deferred reference count update process. Notably, the metadata structures (e.g., indexing) of the refcount log may be dismantled as the log is processed to reclaim storage space of the circular log (i.e., refcount log). The dismantled (i.e. collapsed) metadata structures may themselves be deleted by inserting associated deletion requests into the refcount log. Accordingly, the refcount may be self-collapsing.

According to the deferred reference count update technique, a batch of page keys to be deleted may be stored in the refcount log as one or more delete requests issued by the volume layer. As noted, deletions occur as a result of overwrites, hole (punches) and LUN deletes (or portion of an entire LUN). In the case of a LUN delete, the metadata pages of an entire dense tree, as well as the user data associated with the dense tree, are deleted. During a merge operation between, e.g., level 0 and level 1 of the dense tree, existing metadata pages of level 0 and level 1 may be deleted and rewritten as new, merged metadata pages. The page keys of a batch of the existing metadata pages may be organized, e.g., in memory, as one or more delete requests. Once the merge operation completes, the page keys of the delete requests are inserted into the lowest level of the refcount log persistently, e.g., on SSD. Subsequently, the deferred update process may examine the refcount log to determine which page keys need to be deleted. The process then deletes each key from the extent store layer. Notably, each batch of keys may be homogenous as to type, i.e., either all deletion requests or all increments (duplicates), and, thus, may be processed concurrently. Note further that a separate refcount log may be maintained for each dense tree to benefit from concurrent operation.

The deferred reference count update technique described herein reduces write amplification in accordance with a mechanism for tracking progress of the refcount log. When processing a batch of page keys of one or more delete requests, a crash may occur; accordingly a mechanism is needed to track progress of resolution of the deletion requests so that, upon crash recovery, the resolution can resume from the point of crash. According to the technique, use of transaction log entries enables tracking of such progress by recording completion of deletion requests. The transaction log is illustratively an NVRAM log (i.e., an NVlog 285) used to ensure non-idempotency of individual delete requests, i.e., support repeatability (idempotency) of a merge operation (i.e., merger of entire levels of the dense tree), and track progress of the requests. This eliminates the need to rewrite refcount log information on SSD that would otherwise have been needed to track such progress. The volume layer writes a group of transaction logs for a number of page key delete requests, e.g., as a buffer to the NVRAM for logging in the transaction log. Each time a key is deleted from the extent store layer (i.e., deletion is completed), the deletion is logged in NVRAM to enable the operation to happen only once (and exactly once) according to "exactly once" semantics. Illustratively, the progress tracking information may be maintained "on top of" the logged deletion information in the transaction log. Notably, the transaction log also supports rollback of refcount increments (e.g., for user data pages) which may have been logged during the merge operation.

NVRAM Loss Handling

The embodiments herein are directed to a technique for determining a safepoint for restoring a file system (e.g., the volume layer and extent store layer) of the storage I/O stack to a deterministic point-in-time state in the event of failure (loss) of NVRAM. To that end, the technique enables restoration of the file system to a safepoint (e.g., generated periodically over one to two seconds) stored on SSD of the node with minimum data and metadata loss. As used herein, the safepoint is a point-in-time during processing of I/O (e.g., write) requests at which data and related metadata of the write operations prior to the point-in-time are safely persisted on SSD such that the metadata relating to an image of the file system on SSD (on-disk) is consistent and complete. Although there may be loss of data and metadata before the point-in-time (i.e., before a next safepoint is reached), previous data and metadata stored on disk from a prior safepoint and earlier are preserved. As noted, the data may be organized as variable-length extents of one or more LUNs served by the node. The metadata may include mappings from LBA ranges (i.e., offset ranges) of a LUN to extent keys, as well as mappings of the extent keys to SSD storage locations of the extents. The extent store layer performs and maintains the mappings of the extent keys to SSD storage locations, while the volume layer performs and maintains the mappings of the LUN offset ranges to the extent keys.

As described herein, various layers of the storage I/O stack (e.g., persistence, volume and extent store layers) use the NVRAM 280. The persistence layer 330 uses the NVRAM to store content, such as (user) data. Note that the loss of persistence layer content in the NVRAM results in loss of user data, but generally does not lead to file system metadata inconsistency or incompleteness. That is, although data may be lost in the event of NVRAM failure (loss), the integrity of the file system on disk (as reflected by the volume and extent metadata related to the data) is not necessarily affected. However, losing volume and extent store (ES) layer metadata content may place the on-disk file system in a non-deterministic state. Operations on the (volume) metadata processed by the file system (e.g., volume layer) may modify or change the metadata of various data structures (e.g., dense trees 700) related to the on-disk file system, as well as modify or change contents of NVRAM 280, which changes modify the on-disk file system. The operations on the (volume) metadata are illustratively processed by threads of execution, i.e., uniprocessor (UP) services, on the one or more CPUs 210 of the nodes. For example, as the volume layer 340 modifies (updates) the file system structure on-disk, metadata directed to the updates are stored as records in NVRAM 280 and losing that metadata places the file system in an inconsistent (or non-deterministic) state.

In an embodiment, the safepoint may be implemented as an epoch (a period of time during which writes stored on SSD are self-consistent). Illustratively, the persistence layer 330 assigns to each write request (write) an epoch value or identifier (ID) as the write is recorded (committed) to NVRAM 280. The epoch ID is illustratively a monotonically increasing number (e.g., increasing periodically, such as a wall clock driven increment every 1 second) at the same time for all (persistence) UP services. In essence, the epoch represents a synchronization point across all the UP services. Writes committed to the NVRAM before the increase of the epoch ID belong (i.e., assigned) to a previous epoch, whereas writes committed to NVRAM after the increase of the epoch ID belong to a current epoch. For example, all writes received at the persistence layer before the increase of the epoch ID are assigned epoch ID N (i.e., the previous epoch) and all writes received at the persistence layer after the increase of the epoch ID are assigned epoch ID N+1 (i.e., the current epoch).

According to the technique, the safepoint may refer to an epoch ID value of N with the following properties: (i) any writes assigned the epoch ID value equal to or less than N should not have any associated NVRAM records in either the volume layer or the extent store (ES) layer of the storage I/O stack, (i.e., the associated NVRAM records are reclaimed/purged when all writes up to the safepoint are safely and persistently stored on disk as part of the on-disk file system image); and (ii) any writes assigned an epoch ID value greater than N should be isolated from the writes assigned the epoch ID value equal to or less than N (i.e., in-flight writes are isolated from the writes persistently stored prior to the safepoint to thereby prevent harm to the on-disk file system image). Accordingly, persistently stored writes before the safepoint are point-in-time isolated from later writes and represent a checkpoint that may be used for recovery of the on-disk file system to a consistent state in the event of NVRAM loss. The first property (i) guarantees that, in the event of NVRAM loss, there will be no impact to the state of writes on disk assigned epoch IDs less than or equal to N. For a given write, the associated NVRAM records is include both the NVRAM record for the write as well the NVRAM records for related metadata (staging buffers, dense tree level headers, ES metadata). The second property (ii) guarantees that the data and metadata records assigned epoch IDs less than or equal to N are separate from metadata records assigned epoch IDs greater than N. The technique thus prevents deletion (overwriting) of data and metadata at the ES layer until a next (currently being generated) safepoint is reached. That is, all data and metadata associated with writes prior to the current safepoint are isolated (i.e., separate) from the current safepoint, i.e., no data or metadata may be deleted before a prior safepoint. As such, a current epoch N may include newest writes, while older writes included in an epoch N−1 are being persistently stored prior to the current safepoint (i.e., the older writes in epoch N−1 are isolated from the newest writes in epoch N), and already recorded writes before a previous safepoint (i.e., included in an epoch N−2) are isolated from later epochs N−1 and N.

Notably, the on-disk file system image that captures all writes assigned to an epoch (i.e., a safepoint having the above properties) represents a checkpoint that may be used for recovery of the on-disk file system to a consistent state in the event of NVRAM loss. Increasing the epoch ID involves activities such as, e.g., establishing a barrier to disallow future writes and then, upon increasing the epoch ID, releasing the barrier. Illustratively, the persistence layer 330 organizes the writes to ensure that the on-disk file system image is consistent and preserves write ordering. Each persistence UP service may calculate a number of writes issued to the volume layer during a given epoch and inform the volume layer of that calculation at the end of each epoch.

The volume layer manages activity involving (volume) metadata related to the writes (e.g., I/O operations), including the progress of an epoch and reaching a corresponding safepoint. For an I/O operation to be considered safe (i.e., recoverable from SSD in the event of failure) by the volume layer, the data as well as the related (volume) metadata records in NVRAM are rendered safe. Illustratively, the I/O operation is rendered safe by the volume layer when all the data and metadata associated with the operation are persistently stored on disk as acknowledged by the ES layer.

Figure 18:
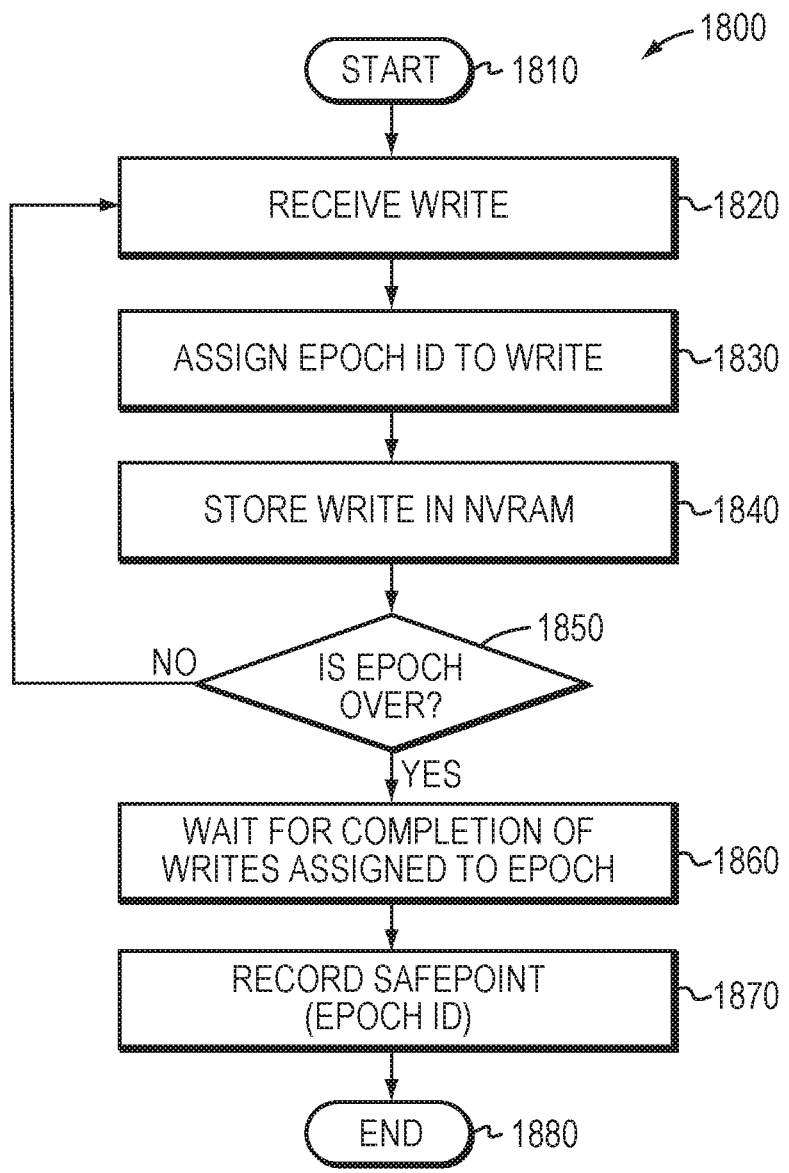
FIG. 18 is an example procedure for determining a safepoint for restoring a file system of the storage I/O stack.

FIG. 18 is an example procedure for determining a safepoint for restoring a file is system of the storage I/O stack. According to the technique, each volume UP service determines a safepoint and records the current epoch ID so as to identify that safepoint. The procedure starts at step 1810 and proceeds to step 1820 where each write is received at the storage I/O stack (persistence layer). At step 1830, the write is assigned a (current) epoch ID and, at step 1840, is stored in NVRAM. At step 1850, a determination is made, e.g., by the volume layer, as to whether the current epoch ends (is over). Note that a safepoint may be determined for each volume UP service by tracking a total amount of I/O operations (i.e., writes) processed by the service during a given epoch. If the current epoch is not over, the procedure returns to step 1820; otherwise, the procedure proceeds to step 1860 where the volume layer waits for acknowledgement (confirmation) from the ES layer that each write (user data as well as related metadata) assigned to the epoch is persistently stored on SSD (i.e., all I/O operations are complete). Note that the volume layer may continue to receive and process I/O operations (i.e., in a next epoch) while waiting for completion (i.e., acknowledgement) from the ES layer that writes associated with the current epoch are persistently stored. At step 1870, the safepoint may be recorded persistently (e.g., to SSD, such as the CDB) as the epoch ID assigned to the completed writes. The procedure then ends at step 1880. Note that, in an embodiment, each volume UP service may perform operations independently, including tracking completion of I/O operations during each epoch (i.e., progress towards a respective safepoint) so as to minimize the interaction between different UP services. Illustratively, the safepoint is a minimum of completed (recorded) epoch IDs among all volume UP services, i.e., the safepoint among all volume UP services is the minimum recorded epoch ID across all the services.

In an embodiment, the ES layer 350 may acknowledge the safe and persistent on-disk storage (i.e., completion) of the I/O operations to the volume UP service when all operations assigned to an epoch and issued by the volume UP service are safe.

Alternatively, the ES layer may acknowledge the safe and persistent on-disk storage of each I/O operation issued by a volume UP service. Notably, an I/O operation is considered safe by the ES layer when both the data and related ES metadata have been persisted on SSD 260. Upon receiving an acknowledgement, the volume UP service is assured that all I/O operations for the particular epoch have been committed to disk. For an epoch to be considered as complete and safe (i.e., a safepoint) for the volume UP service, all I/O operations issued by persistence layer 330 for that epoch, as well as volume metadata related to the operations, should be safe.

In addition to metadata updates related to user data operations, the volume layer 340 may update metadata on SSD 260 for dense tree merge operations and refcount log drain operations. As noted during a dense tree merge operation, a (new) active dense tree 1150 is created. Illustratively, the technique confirms that the new dense tree 1150 is completely persisted on disk (SSD) and is safe before the (old) merge dense tree 1120 may be deleted. To ensure that the old dense tree 1120 is not affected, the technique obviates reuse of keys for metadata pages 720, i.e., no keys for the metadata pages of the old dense tree 1120 are re-used by the new dense tree 1150, as well as updates of the level headers. Accordingly, the technique generally does not overwrite the old dense tree, including headers and dense tree pages (i.e., metadata pages); all metadata is created as new pages.

In an embodiment, an absence of modifications (updates) to a level of the dense tree may enable sharing of metadata entries of that level between the new (active) dense tree 1150 and the old (merge) dense tree 1120. For example, metadata entries 600 may be shared between the active dense tree 1150 and the merge dense tree 1120 if a level of the dense tree is not modified during a merge operation, i.e., a merge occurs between level 0 and level 1, and level 2 is not modified. Such sharing may be applied since the absence of modifications to level 2 does not impact any of the properties to be preserved. Any index entries 620 created when merging level 0 to level 1 to make a new level 1 simply point to a shared level 2 that is unmodified. Subsequently when deleting the merge dense tree 1120, the older versions of level 0 and level 1 are removed and level 2 remains as part of the active dense tree 1150.

Once the active dense tree 1150 is completely created, the volume superblock 760 is updated to point to the dense tree 1150 while still retaining a pointer to the merge dense tree 1120. No metadata pages 720 are shared; the old pages may be copied and is inserted into the active dense tree. As previously noted, each level of the dense tree includes a level header (e.g., 730, 740, 750) and metadata pages 720. According to the technique, new level headers (as well as new pages) are created to avoid reuse of the old level headers. The technique preserves the entire merge dense tree 1120 on disk (SSD) completely when creating the active dense tree 1150, which necessitates creating all new metadata pages and level headers. Performance of a dense tree merge operation in this manner ensures that new content will not overwrite old content, unless it is determined that the old content is no longer needed, e.g., when advancing beyond the safepoint at which time the merge dense tree 120 may be safely deleted. Accordingly, when safe and persistent storage of all metadata pages 720 of the active dense tree 1150 is acknowledged by the ES layer 350, the pointer to the merge dense tree 1120 may be deleted from the superblock 760 and the metadata pages of the merge dense tree may be moved to the refcount log 1620.

As noted, the refcount log 1620 is a multi-level data structure maintained on SSD 260 that is continuously updated as extents 470 are deleted by, e.g., draining refcount log pages. A batch of page keys to be deleted may be stored in the refcount log 1620 as one or more delete requests issued by the volume layer 340. The transaction log is an NVRAM log (i.e., an NVlog) that tracks progress of the delete request processing so that, upon crash recovery, the processing of the delete requests can resume from the point of crash. The technique described herein is directed to restoration of the on-disk file system in response to NVRAM loss, which loss may result in loss of the transaction log and, therefore, the refcount log. Loss of the refcount log 1620 may, in turn, result in incorrect reference count values on the extents 470 as managed by ES layer 350. According to the technique, correction of the reference count values may be rendered by discarding the on-disk refcount log structure and running a consistency checker to fix the refcount log by, e.g., examining the refcounts of all extents in the storage system and fixing the reference count values.

Upon reboot after NVRAM loss, the technique identifies (i) the most recent safepoint, as well as (ii) the in-flight writes that were persistently stored on disk after the most recent safepoint. In an embodiment, the most recent safepoint is stored on the is cluster database (CDB 244) and is illustratively a minimum of recorded epoch IDs among all volume UP services. Each volume UP service identifies a safepoint (as described above) and records that epoch ID as its safepoint in the CDB. Upon reboot, the epoch IDs are examined and the minimum of recorded epoch IDs is chosen as the most recent safepoint. The data and metadata of those inflight writes are then deleted to place the on-disk file system to its state at the most recent safepoint. Note that any data and metadata loss is limited; that is, data and metadata may be lost during a last incomplete epoch (e.g., one to two seconds), but the file system remains consistent.

While there have been shown and described illustrative embodiments for restoring a file system of a storage I/O stack to a deterministic point-in-time state in the event of failure (loss) of NVRAM of a node, it is to be understood that various other adaptations and modifications may be made within the spirit and scope of the embodiments herein. For example, embodiments have been shown and described herein with relation to implementing a safepoint using an epoch. However, the embodiments in their broader sense are not so limited, and may, in fact, allow for the use of sequence numbers for each I/O operation instead of an epoch to determine a safepoint.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   recording a plurality of write requests (writes) received at a storage system to a non-volatile random access memory (NVRAM) as NVRAM records, each write having data and metadata;
   processing the writes by services executing on the storage system, wherein the processing includes operations that (i) modify the metadata of the writes relating to a file system stored on a storage device coupled to the storage system and (ii) change the metadata of the NVRAM records that modify the file system, wherein the metadata of the writes includes mappings of logical block addresses to keys associated with the data of the writes;
   assigning each write a value associated with an epoch, wherein the epoch is a periodic interval of time when the writes stored on the storage device are self-consistent, wherein the metadata of a respective write includes an identifier for the epoch associated with the respective write; and
   capturing the writes assigned to the epoch within an image of the file system such that the epoch is completed as a synchronization point across the services without the NVRAM records remaining associated with the completed epoch and represents a checkpoint used for recovery of the file system to a consistent state.

2. The method of claim 1 wherein the completed epoch is configured to implement a safepoint comprising a point-in-time during processing of the writes at which the data and the metadata of the writes prior to the point-in-time are safely persisted on the storage device and wherein the metadata of the file system image is consistent.

3. The method of claim 1 wherein in-flight writes are isolated from the writes already safely persisted on the storage device.

4. The method of claim 1 wherein the data and the metadata of the writes are safely persisted on the storage system when the data and metadata associated with the writes are persistently stored to the storage device.

5. The method of claim 1 wherein processing of the metadata determines when the epoch ends.

6. The method of claim 1 wherein the value associated with the epoch is a monotonically increasing number.

7. The method of claim 1 further comprising:
   recording the value associated with the completed epoch to identify the checkpoint.

8. The method of claim 1 further comprising:
   tracking a total amount of writes processed by each service during the completed epoch to determine the checkpoint.

9. The method of claim 1 further comprising:
   identifying the checkpoint as a point-in-time when there is a minimum of recorded epoch values among the services; and
   identifying in-flight writes persistently stored on the storage device after the checkpoint, wherein the in-flight writes are writes received by the storage system and acknowledged to a host, and wherein the inflight writes have the data and the metadata stored in the NVRAM that are not persistently stored on the storage device.

10. The method of claim 1 further comprising:
    deleting the data and the metadata of in-flight writes to place the file system at a point-in-time during processing of the writes at which the data and the metadata of the writes prior to the point-in-time are safely persisted on the storage device.

11. A system comprising:
    a central processing unit (CPU) coupled to one or more storage devices;
    a non-volatile random access memory (NVRAM) coupled to the CPU; and
    a memory coupled to the CPU and configured to store a storage input/output (I/O) stack executable by the CPU, the storage I/O stack configured to:
    record a plurality of write requests (writes) to the NVRAM as NVRAM records, each write having data and metadata;

process the writes by services of the storage I/O stack, wherein the process includes operations that (i) modify the metadata of the writes relating to a file system stored on the storage devices and (ii) change the metadata of the NVRAM records that modify the file system, wherein the metadata of the writes includes mappings of logical block addresses to keys associated with the data of the writes;

assign each write a value associated with an epoch, wherein the epoch is a periodic interval of time when the writes stored on the storage devices are self-consistent, wherein the metadata of a respective write includes an identifier for the epoch associated with the respective write; and capture the writes assigned to the epoch within an image of the file system such that the epoch is completed as a synchronization point across the services without an NVRAM record remaining associated with the completed epoch and represents a checkpoint used for recovery of the file system to a consistent state.

12. The system of claim 11 wherein the completed epoch is configured to implement a safepoint comprising a point-in-time during processing of the writes at which the data and the metadata of the writes prior to the point-in-time are safely persisted on the storage devices and wherein the metadata of the file system image is consistent.

13. The system of claim 11 wherein in-flight writes are isolated from the writes already safely persisted on the storage devices.

14. The system of claim 11 wherein the data and the metadata of the writes are safely persisted on the storage system when the data and the metadata associated with the writes are persistently stored to the storage devices.

15. The system of claim 11 wherein the storage I/O stack configured to process the writes at the file system is further configured to:
determine when the epoch ends by processing of the metadata.

16. The system of claim 11 wherein the value associated with the epoch is a monotonically increasing number.

17. The system of claim 11 wherein the storage I/O stack is further configured to:
record the value associated with the completed epoch to identify the checkpoint.

18. The system of claim 11 wherein the storage I/O stack is further configured to:
identify the checkpoint as a point-in-time when there is a minimum of recorded epoch values among the services; and
identify in-flight writes persistently stored on the storage devices after the checkpoint, wherein the in-flight writes are writes received by the system and acknowledged to a host, and wherein the inflight writes have the data and the metadata stored in the NVRAM that are not persistently stored on the storage devices.

19. The system of claim 11 wherein the storage I/O stack is further operable to:
delete the data and the metadata of in-flight writes to place the file system to a state at a point-in-time during processing of the writes at which the data and metadata of the writes prior to the point-in-time are safely persisted on the storage devices.

20. A non-transitory computer readable medium including program instructions for execution on one or more processors, the program instructions configured to:
record a plurality of write requests (writes) received at storage input/output (I/O) stack executing on the one or more processors to a non-volatile random access memory (NVRAM) as NVRAM records, each write having data and metadata;
process the writes by services of the storage I/O stack, wherein the services process the metadata and the data in parallel and include operations that (i) modify the metadata of the writes relating to the file system stored on storage devices coupled to the one or more processors and (ii) change the metadata of the NVRAM records that modify the file system, wherein the metadata of the writes includes mappings of logical block addresses to keys associated with the data of the writes;
assign each write a value associated with an epoch, wherein the epoch is a periodic interval of time when the writes stored on the storage devices are self-consistent, wherein the metadata of a respective write includes an identifier for the epoch associated with the respective write; and
capture the writes assigned to the epoch within an image of the file system such that the epoch is completed as a synchronization point across the services without an NVRAM record remaining associated with the completed epoch and represents a checkpoint used for recovery of the on-disk file system to a consistent state.

* * * * *